United States Patent
Seki et al.

(10) Patent No.: US 6,304,624 B1
(45) Date of Patent: Oct. 16, 2001

(54) COHERENT DETECTING METHOD USING A PILOT SYMBOL AND A TENTATIVELY DETERMINED DATA SYMBOL, A MOBILE COMMUNICATION RECEIVER AND AN INTERFERENCE REMOVING APPARATUS USING THE COHERENT DETECTING METHOD

(75) Inventors: Hiroyuki Seki; Yoshinori Tanaka; Shuji Kobayakawa; Takeshi Toda, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/168,119

(22) Filed: Oct. 7, 1998

(30) Foreign Application Priority Data

Oct. 24, 1997 (JP) .................................................. 9-292063
Jun. 5, 1998 (JP) .................................................. 10-157085

(51) Int. Cl.$^7$ ............................. H04L 7/06; H04L 27/30
(52) U.S. Cl. ......................... 375/365; 375/316; 375/130
(58) Field of Search .................................. 375/365, 136, 375/137, 316, 147, 347, 349, 354, 342, 335, 320; 455/66, 226.1

(56) References Cited

U.S. PATENT DOCUMENTS

| | | | |
|---|---|---|---|
| 5,065,411 | * 11/1991 | Muto | 375/232 |
| 5,231,648 | * 7/1993 | Driedger et al. | 375/231 |
| 6,070,086 | * 5/2000 | Dobrica | 455/522 |
| 6,178,194 | * 1/2001 | Vasic | 375/136 |

\* cited by examiner

*Primary Examiner*—Chi Pham
*Assistant Examiner*—Khai Tran
(74) *Attorney, Agent, or Firm*—Helfgott & Karas, P.C.

(57) ABSTRACT

A coherent detecting circuit accurately estimates a propagation characteristic of a propagation path without increasing the number of pilot symbols when a fading frequency is high so that an error rate of received data is decreased. At least one pilot symbol is received from a transmitter. The pilot symbol may be provided in a data frame of data symbols, or transmitted through a channel different from a channel of the data symbols. A first estimated value of the propagation characteristic of a propagation path is estimated by using the pilot symbol. The data symbols are tentatively determined based on an estimated value of the propagation path. A second estimated value of the propagation characteristic is estimated by using the pilot symbol and at lease one of the tentatively determined data symbols. The data symbols are finally determined based on the second estimated value of the propagation characteristic.

10 Claims, 18 Drawing Sheets

COHERENT DETECTING METHOD USING A PILOT SYMBOL AND A TENTATIVELY DETERMINED DATA SYMBOL, A MOBILE COMMUNICATION RECEIVER AND AN INTERFERENCE REMOVING APPARATUS USING THE COHERENT DETECTING METHOD

BACKGROUND OF THE INVENTION

1. Field of the Invention

The present invention generally relates to a coherent detecting method and, more particularly, to a coherent detecting method which performs a detection of synchronism by estimating a propagation characteristic of a propagation path by using a pilot symbol and a data symbol.

2. Description of the Related Art

In a mobile communication system, when a terminal moves under a condition in which a multipath is formed, fluctuation is generated in a receiving signal due to fading. When the received signal is decoded under such a condition, a method for performing a synchronism detection is generally used, in which method a propagation characteristic (a fading complex path) is estimated from a received pilot symbol so as to reduce influences of fading caused by a propagation characteristic of the propagation path.

The above-mentioned pilot symbol is a known symbol having a predetermined amplitude and a predetermined phase. The pilot symbol can be transmitted from a transmitter by being provided in a data frame of data symbols. Alternatively, the pilot symbol may be transmitted through a channel different from a channel through which the data symbols are transmitted.

When the pilot symbol is provided in the data string of the data symbols, the pilot symbol is inserted at a predetermined position of the data frame to be transmitted. On the receiver side, the position of the pilot symbol is detected according to synchronization with a preamble added to the data frame. The detected pilot symbol is demodulated so as to assume or estimate a characteristic of the propagation path from an amplitude and a phase of the detected pilot symbol.

A description will now be given of a conventional receiver including a coherent detecting circuit using a pilot symbol provided in a data string of data symbols.

FIG. 1 is an illustration of a data frame provided with pilot symbols. FIG. 1-(A) shows a data frame to be transmitted, and FIG. 1-(B) shows data symbol strings and the pilot symbols in encoded data. As shown in FIG. 1-(A), the data frame 12-1 comprises a preamble 12-2 and the encoded data 12-3. The encoded data includes, as shown in FIG. 1-(B), a plurality of data symbol strings 12-4 and a plurality of pilot symbols 12-5. A plurality of pilot symbols are provided between adjacent data symbol strings 12-4 at uniform intervals. The portion in which the pilot symbols are provided is referred to as a pilot block 12-6.

The pilot symbol 12-5 is a previously determined, known data symbol. The pilot symbol 12-5 is transmitted at a predetermined time interval after the preamble 12-2 is transmitted by a transmitter. If synchronism is achieved between a receiver and a receiving signal transmitted by the transmitter and received via a propagation path, the receiver can assume a propagation characteristic of the propagation path from the received signal with respect to a time position.

The receiver can synchronize with the receiving signal by detecting the preamble 12-2 provided in the data frame 12-1.

Now, a pilot symbol which is the k-th pilot symbol in the n-th pilot block transmitted by the transmitter is represented by Znk, and a propagation characteristic at the time the pilot signal is transmitted is represented by $\xi nk$. A receiving symbol received via the propagation path is represented by $Znk \cdot \xi nk$.

Since a transmitted symbol at the time position is the pilot symbol Znk which is a known symbol, $\xi nk \cdot |Znk|^2$ is obtained by multiplying the receiving symbol by Znk* which is a complex conjugate of the pilot symbol Znk. Since a magnitude (amplitude) of the pilot symbol is a known value (may be $|Znk| \equiv 1$), the propagation characteristic $\xi nk$ of the propagation path can be estimated.

The estimated value $\xi nk\hat{}$ of the propagation characteristic can be represented as follows.

$$\xi nk\hat{} = Znk \cdot \xi nk \cdot Znk^* = \xi nk \cdot |Znk|^2 \qquad (1)$$

However, in practice, since the receiving symbol is influenced by interference caused by noise and other signals, the propagation characteristic of the propagation path cannot be accurately estimated. In order to more accurately assume the propagation characteristic, a plurality of pilot symbols may be provided in a single pilot block 12-6 so as to obtain an estimated value of the propagation characteristic for each of the pilot symbols. An average value of the estimated value of the propagation characteristic is determined to be the estimated value of the propagation characteristic of the propagation path. It is estimated that an estimated value of the propagation characteristic of the n-th pilot block is represented by $\xi n\hat{}$.

The propagation characteristic of the propagation path between two pilot blocks 12-6 can be obtained by averaging propagation characteristics at the positions of the two pilot blocks 12-6 or performing a liner interpolation on the propagation characteristics.

After the estimated value of the propagation characteristic of the propagation path is obtained, the transmitted data symbol is obtained as follows. It is estimated that the i-th transmitted data symbol between the n-th pilot block and the (n+1)-th pilot block is represented by Xni; an actual value of the propagation characteristic of the propagation path is represented by $\xi ni$; an estimated value of the propagation characteristic of the propagation path is represented by $\xi ni\hat{}$; and a decoded data symbol is represented by $Xni\hat{}$.

The received data symbol transmitted through the propagation path is represented by $Xni \cdot \xi ni$, which is obtained by multiplying the transmission data symbol Xni by the actual value $\xi ni$ of the propagation characteristic of the propagation path. The transmission data symbol Xni can be obtained as the decoded data symbol $Xni\hat{}$, in which the influence of the propagation characteristic $\xi ni$ is reduced, by multiplying $Xni \cdot \xi ni$ by the complex conjugate $\xi ni\hat{}^*$ of the estimated value $\xi ni\hat{}$ of the propagation characteristic. The decoded data symbol $Xni\hat{}$ is represented by the following equation.

$$Xni\hat{} = Xni \cdot \xi ni \cdot \xi ni\hat{}^* / |\xi ni\hat{}|^2 \qquad (2)$$

The thus-obtained decoded data symbol is subjected to a diversity-combining and is determined as a predetermined discrete data symbol when compared with a predetermined threshold value by a determining circuit. Thereafter, the decoded data symbol is subjected to a decoding process such as deinterleaving or a bit error correction so as to be reproduced as data. FIG. 2 shows a receiver including a conventional coherent detecting circuit using pilot symbols provided in data symbols.

In FIG. 2, a signal received by an antenna (ANT) 13 is input to a radio unit 14. In the radio unit 14, the received signal is amplified by an amplifier (LNA) 14-1, and all but a component of a predetermined bandwidth is eliminated by a band-pass filter (BPF) 14-2. Additionally, the received signal is converted into a base bandwidth by being multiplied by a signal LO in a mixer 14-3. Then, a high-frequency component is removed by a low-pass filter (LPF) 14-4, and the received signal is output to an A/D circuit 15.

The A/D circuit 15 quantizes the received signal supplied by the radio unit 14 so as to convert the received signal into a digital signal, and outputs the digital signal to a timing synchronizing circuit 16. The timing synchronizing circuit 16 performs a synchronization by using the digitized received signal, and outputs the digitized received signal to a coherent detecting circuit 17.

In the coherent detecting circuit 17, a propagation path estimation circuit 17-1 calculates the estimated value $\xi ni\hat{}$ of the propagation characteristic of the propagation path based on the above-mentioned equation (1) so as to obtain a complex conjugate $\xi ni\hat{}^*$ of the estimated value $\xi ni\hat{}$. Then, the thus-obtained complex conjugate $\xi ni\hat{}^*$ is output to a multiplier 17-3.

The multiplier 17-3 performs a synchronism detection by multiplying the received signal, after passing through a delay circuit 17-2, by the complex conjugate $\xi ni\hat{}^*$ output from the propagation path estimation circuit 17-1. The decoded data symbol $Xni\hat{}$ is output to a diversity-combining circuit 17-4.

It should be noted that, in the above-mentioned coherent detecting circuit 17, The decoded data symbol $Xni\hat{}$ is calculated by multiplying the received signal $Xni \cdot \xi ni$ by the complex conjugate $\xi ni\hat{}^*$ of the estimated value of the propagation characteristic whereas the multiplication should be performed by using $\xi ni\hat{}^* / |\xi ni\hat{}|^2$. However, since the calculation of $|86\ ni\hat{}|^2$ influences only an amplitude component of the decoded data symbol $Xni\hat{}$, the multiplication performed by the multiplier 17-3, that is, the multiplication by the complex conjugate $\xi ni\hat{}^*$ of the estimated value of the propagation characteristic, can be used as a substitute.

The decoded data symbol $Xni\hat{}$ is diversity-synthesized by the diversity-combining circuit 17-4 with decoded data symbols obtained by other similar circuits. The synthesized decoded data symbol is determined as a predetermined discrete data symbol by being compared with a predetermined threshold value by a determining circuit 17-5, and is output to a decoder 18.

As can be appreciated from the above-mentioned equation (2), if the actual value $\xi ni$ of the propagation characteristic and the estimated value $\xi ni\hat{}$ of the propagation characteristic are equal to each other, the decoded data symbol $Xni\hat{}$ coincides with the transmitting data symbol $Xni$. However, if a difference between the actual value $\xi ni$ and the estimated value $\xi ni\hat{}$ of the propagation characteristic of the propagation path is large, a difference between the decoded data symbol $Xni\hat{}$ and the transmitting data symbol $Xni$ is also large.

Accordingly, it is important to accurately assume the actual value of the propagation characteristic of the propagation path so as to accurately decode the data symbol. One of the methods to increase accuracy of the assumption of the propagation characteristic is to increase the number of pilot symbols to be provided in the pilot block 12-6. However, if the number of pilot symbols is increased, a data transmission efficiency is deteriorated since the number of data symbols to be transmitted is decreased.

Additionally, if there is a large difference in the propagation characteristic between the pilot blocks, that is, if a fading frequency is high, an estimating method using a pilot symbol having a fixed period cannot accurately assume the propagation characteristic of a data symbol of a data symbol string positioned between the pilot blocks in response to the fading frequency.

Generally, when the fading frequency is low, an accuracy of an average value of the propagation characteristic is higher than an accuracy of a value obtained by an interpolation in an area in which a value of a normalized fading frequency $fd \cdot Tp$ is smaller than about 0.1, where $fd$ is a maximum Doppler frequency and $Tp$ is a period of the pilot blocks.

On the other hand, if the normalized fading frequency $fd \cdot Tp$ is high, the interpolation is superior to the averaging method in an area where the normalized fading frequency $fd \cdot Tp$ is greater than about 0.1. However, even if the interpolation is adopted, the accuracy of assumption for an area in which the normalized fading frequency $fd \cdot Tp$ is high is deteriorated as compared to that of an area in which the normalized fading frequency $fd \cdot Tp$ is low. As a result, a data error rate is increased.

Additionally, as mentioned above, a pilot symbol may be transmitted through a channel different from a channel through which a data symbol is transmitted. That is, the pilot symbol may be multiplexed with the data symbol by being transmitted through a channel that is orthogonal to the channel of the data symbol. Since the pilot symbol is concurrently transmitted with the data symbol, this method is referred to as a concurrent pilot-channel method.

In this method, the data symbol and the pilot symbol are multiplied by codes orthogonal to each other so as to modulate the data symbol and the pilot symbol according to an I-channel and a Q-channel, respectively. This method is particularly referred to as a pilot IQ multiplex method.

Since the synchronism detection with the thus-provided pilot symbol includes a process for demultiplexing the pilot symbol and the data symbol, an application for a mobile communication field by a Direct Sequence Code Division Multiple Access (DS-CDMA) has been considered.

In this method, since the pilot symbol and the data symbol are orthogonal to each other, those symbols can be separated from each other after a demodulation on the receiver side. The separated symbol is used for estimating a characteristic of the propagation path, and the received data symbol can be subjected to an accurate synchronism detection based on the estimated propagation characteristic.

An assumption or estimation of a characteristic of the propagation path can be performed in the same manner as described above.

That is, an estimated value $\xi n\hat{}$ of the propagation characteristic corresponding to the n-th pilot symbol $Zn$ can be represented as follows.

$$\xi n\hat{} = Zn \cdot \xi n \cdot Zn^* = \xi n \cdot |Zn|^2 \qquad (3)$$

Additionally, a decoded data symbol $Xn\hat{}$ can be represented by the following equation.

$$Xn\hat{} = Xn \cdot \xi n \cdot \xi n\hat{}^* / |\xi n\hat{}|^2 \qquad (4)$$

FIG. 3 shows a receiver including a conventional coherent detecting circuit 19 using pilot symbols concurrently transmitted with data symbols. In FIG. 3, parts that are the same as the parts shown in FIG. 2 are given the same reference numerals, and descriptions thereof will be omitted.

The coherent detecting circuit 19 of the receiver shown in FIG. 3 has the same construction as the coherent detecting circuit 17 shown in FIG. 2 except for multipliers 19-1 and 19-2 being added. That is, the multiplier 19-1 multiplies the received signal by an orthogonal code X so as to extract a received data symbol, and the multiplier 19-2 multiplies the received signal by an orthogonal code Y so as to extract a received pilot symbol. The orthogonal codes X and Y are orthogonal to each other. It should be noted that the data symbol and the pilot symbol in the received signal have been modulated and multiplexed according to the orthogonal codes X and Y.

The received data symbol output from the multiplier 19-1 is input to the delay circuit 17-2. The received pilot data is input to the propagation path estimation circuit 17-1.

In this estimating method, it is considered to increase a transmission power of the pilot channel so as to increase an accuracy of assumption of the characteristic of the propagation path. However, an increase in the transmission power of the pilot channel may increase a power consumption of a mobile communication terminal. In such a case, in order to maintain the total power consumption of the mobile communication terminal, power consumption for the data channel must be decreased. However, this results in deterioration in an S/N ratio of the data symbol. Additionally, an increase in the transmission power for the pilot channel causes an interference with the data channel. This results in deterioration of a channel capacity characteristic in a DS-CDMA mobile communication.

Additionally, It is a consideration to increase a number of pilot symbols so as to increase an accuracy of assumption of the characteristic of the propagation path. However, when fluctuation in the characteristic of the propagation path relative to an averaging section of the pilot symbols is large, the accuracy may be deteriorated. Thus, the number of pilot symbols that can be averaged has an upper limit.

SUMMARY OF THE INVENTION

It is a general object of the present invention to provide an improved and useful synchronism detection method in which the above-mentioned problems are eliminated.

A more specific object of the present invention is to provide a coherent detecting method which accurately estimates a propagation characteristic of a propagation path without increasing the number of pilot symbols even when a fading frequency is high so that an error rate of received data is decreased.

A further object of the present invention is to provided a coherent detecting method which accurately estimates a propagation characteristic of a propagation path without increasing a transmission power of a pilot channel so that an error rate of received data is decreased.

In order to achieve the above-mentioned objects, there is provided according to one aspect of the present invention a method for detecting synchronism in reception of data symbols transmitted in a mobile communication system by using at least one pilot symbol received from a transmitter, the method comprising the steps of:

a) estimating a propagation characteristic of a propagation path established in the mobile communication system by using the pilot symbol;

b) tentatively determining the data symbols based on an estimated value of the propagation path obtained in step a);

c) estimating the propagation characteristic of the propagation path by using the pilot symbol and at least one of the data symbols tentatively determined in step b); and d) finally determining the data symbols based on an estimated value of the propagation characteristic of the propagation path obtained in step c).

According to the above-mentioned invention, the tentatively determined data symbols are obtained by the estimated value of the propagation characteristic of the propagation path which is obtained according to the pilot symbol. The tentatively determined data symbols are less influenced by the actual propagation characteristic of the propagation path. One of the tentatively determined data symbols is regarded as a pilot symbol so that the propagation characteristic at a position corresponding to the one of the tentatively determined data symbols is estimated based on the pilot symbol and the one of the tentatively determined data symbols which is regarded as a pilot symbol. Thus, an accurate propagation characteristic can be obtained, which reduces an error rate of the received data.

In the above-mentioned method, the step d) may include the step of:

repeating a tentative determination of the data symbols based on an estimated value of the propagation characteristic which is obtained according to the pilot symbol and at least one of the data symbols tentatively determined by the immediately preceding tentatively determining step so as to assume the propagation characteristic a plurality of times.

In one embodiment, the pilot symbol provided in a data frame of the data symbols may be used.

Additionally, at least two pilot symbols may be provided in a data string of the data symbols, and the one of the tentatively determined data symbols used in step c) is selected from among the data symbols located substantially midway between the two pilot symbols.

Further, at least two pilot symbols may be provided in a data string of the data symbols, and the propagation characteristic at a position between the two pilot symbols is obtained by interpolation based on estimated values of the propagation characteristic obtained from each of the two pilot symbols and a plurality of data symbols between the two pilot symbols.

In another embodiment of the present invention, the pilot symbol provided in a channel different from a data channel through which the data symbols are transmitted may be used.

Additionally, there is provided according to another aspect of the present invention a mobile communication receiver detecting synchronism in reception of data symbols by using at least one pilot symbol received from a transmitter, the mobile communication receiver comprising:

a first propagation characteristic estimation circuit estimating a first estimated value of a propagation characteristic of a propagation path by using the pilot symbol;

a tentatively determining circuit tentatively determining the data symbols based on the first estimated value of the propagation characteristic obtained by the first propagation characteristic estimation circuit;

a second propagation characteristic estimation circuit estimating a second estimated value of the propagation characteristic by using the pilot symbol and at least one of the data symbols tentatively determined by the tentatively determining circuit; and a final determining circuit determining the data symbols based on the second estimated value of the propagation characteristic obtained by the second propagation characteristic estimation circuit.

The mobile communication receiver may further comprise a plurality of additional tentatively determining circuits connected in series, each of the additional tentatively determining circuits tentatively determining the data symbols based on an estimated value of the propagation characteristic which is obtained by the pilot symbol and at least one of the data symbols tentatively determined by an immediately preceding one of the additional tentative determining circuits.

Additionally, there is provided according to another aspect of the present invention an interference removing apparatus for a mobile communication system in which a string of data symbols and at least one pilot symbol are transmitted, the interference removing apparatus comprising:

a first propagation characteristic estimation circuit estimating a first estimated value of a propagation characteristic of a propagation path by using the pilot symbol;

a tentatively determining circuit tentatively determining the data symbols based on the first estimated value of the propagation characteristic obtained by the first propagation characteristic estimation circuit;

a second propagation characteristic estimation circuit estimating a second estimated value of the propagation characteristic by using the pilot symbol and at least one of the data symbols tentatively determined by the tentatively determining circuit; and a final determining circuit determining the data symbols based on the second estimated value of the propagation characteristic obtained by the second propagation characteristic estimation circuit.

The interference removing apparatus may further comprise a plurality of additional tentatively determining circuits connected in series, each of the additional tentatively determining circuits tentatively determines the data symbols based on an estimated value of the propagation characteristic which is obtained by the pilot symbol and at least one of the data symbols tentatively determined by an immediately preceding one of the additional tentative determining circuits.

Other objects, features and advantages of the present invention will become more apparent from the following detailed description when read in conjunction with the accompanying drawings.

DETAILED DESCRIPTION OF THE PREFERRED EMBODIMENTS

In the present invention, a data symbol which is decoded and determined by using a pilot symbol is regarded as a pilot symbol so that a propagation characteristic of a propagation path is estimated by using the data symbol in the same manner as that of using a convention pilot symbol. Thus, according to the present invention, the propagation characteristic of the propagation path can be estimated in a more accurate manner than a method using only the conventional pilot symbol.

Additionally, in the present invention, the data symbol is decoded and determined again by using the estimated value of the propagation characteristic of the propagation path which is estimated by the above-mentioned method. Accordingly, the determination of the data symbol is performed twice or more in the present invention. In this specification, the determination performed at the end is referred to as a final determination, and a determination preceding the final determination is referred to as a tentative determination.

If there is no determination error in the tentative determination, the data symbol after the tentative determination can be used as a pilot symbol. Thus, by using such a data symbol, the propagation characteristic of the propagation path can be accurately estimated.

However, if there is a determination error in the tentative determination, accuracy of the assumption of the propagation characteristic is deteriorated. Accordingly, when the tentative data symbol is used, the number of the tentatively determined data symbols to be used and positions of the tentatively determined data symbols must be appropriately selected in response to an error rate of the tentative determination and a fading frequency.

Figure 4:
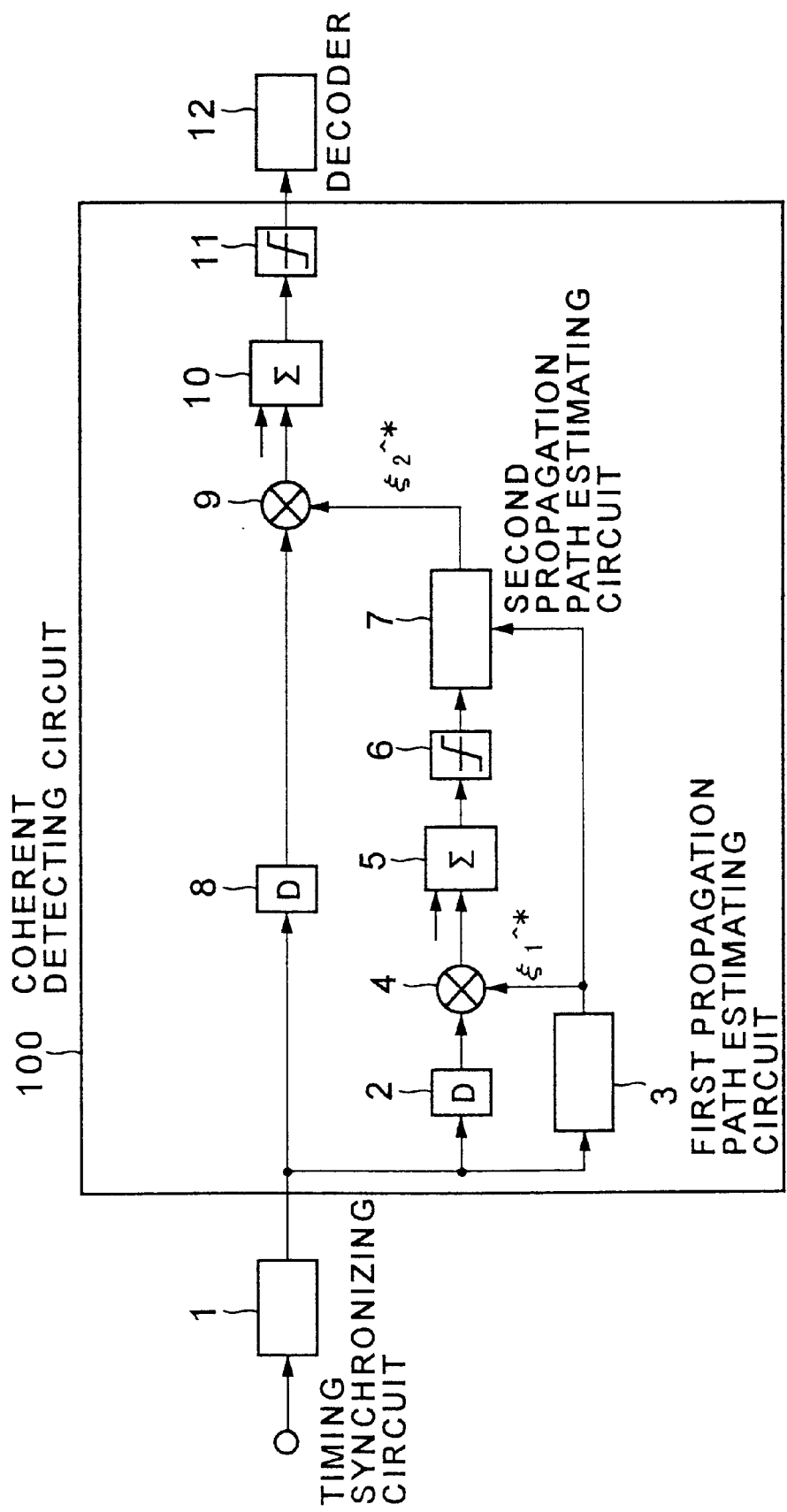
FIG. 4 is a block diagram of a coherent detecting circuit according to a first embodiment of the present invention.
Figure 5:
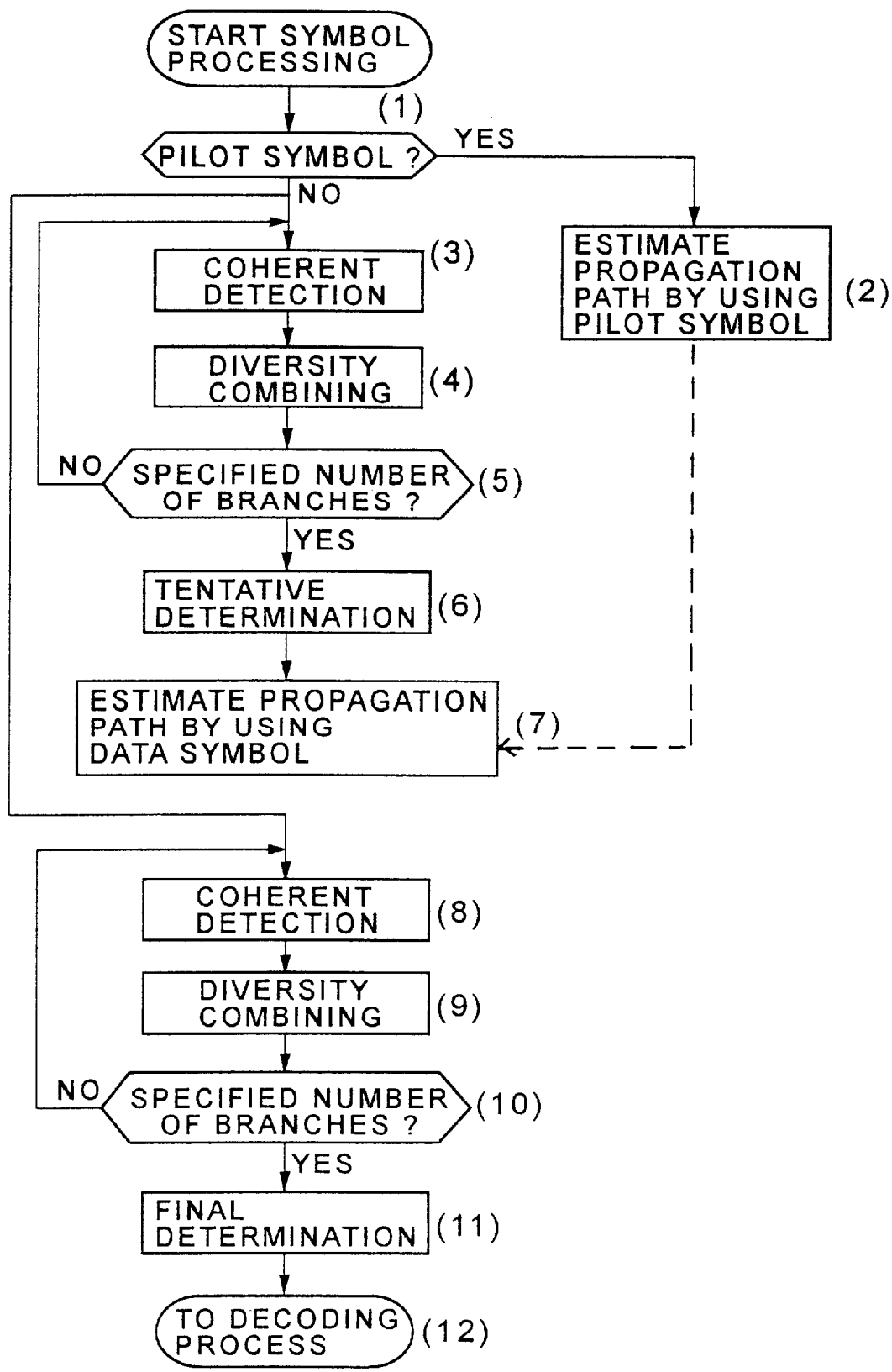
FIG. 5 is a flowchart of an operation of the coherent detecting circuit shown in FIG. 4.

A description will now be given of a first embodiment of the present invention. FIG. 4 is a block diagram of a coherent detecting circuit 100 according to a first embodiment of the present invention. FIG. 5 is a flowchart of an operation performed by the coherent detecting circuit 100 shown in FIG. 4.

As shown in FIG. 4, the coherent detecting circuit 100 according to the first embodiment of the present invention comprises a first delay circuit 2 connected to a timing synchronizing circuit 1, a first propagation path estimation circuit 3 using a pilot symbol, a first multiplier 4, a first diversity-combining circuit 5, a tentative determining circuit 6, a second propagation path estimation circuit 7 using a pilot symbol and a tentatively determined data symbol, a second delay circuit 8, a second multiplier 9, a second diversity-combining circuit 10 and a final determining circuit 11 connected to a decoder 12.

The structure shown in FIG. 4 corresponds to a part after the received signal is converted into a base bandwidth and subjected to an A/D conversion. A structure of a radio part is the same as that of the conventional system shown in FIG. 2. The received signal after being A/D converted is input to the timing synchronizing circuit 1 so that time positions of the pilot symbol and the data symbol are specified.

The pilot symbol and the data symbol whose time positions are specified are input to each of the first delay circuit 2, the second delay circuit 8 and the first propagation path estimation circuit 3. When the procedure is started, it is determined whether or not the pilot symbol is received (step (1) of FIG. 5). If it is determined that the pilot symbol is received, the procedure proceeds to step (2). Otherwise, the procedure proceeds to step (3).

In step (2), the first propagation path estimation circuit 3 estimates, similar to the above-mentioned conventional system, a propagation characteristic of the propagation path by using the pilot symbol. The first propagation path estimation circuit 3 outputs a complex conjugate $\xi 1^{\wedge *}$ of the propagation characteristic of the propagation path, where $\xi 1^{\wedge}$ is an estimated value of the propagation characteristic of the propagation path. Hereinafter, the estimated value $\xi 1^{\wedge}$ may be referred to as an estimated propagation characteristic $\xi 1^{\wedge}$. The output of the first propagation path estimation circuit 3 is multiplied by the received data symbol provided via the first delay circuit 2 by the first multiplier 4 so as to perform a synchronism detection (step (3) of FIG. 5). An output of the first multiplier 4 corresponds to a first decoded data symbol in which influence of the propagation characteristic of the propagation path is reduced. The first decoded data symbol is provided to the first diversity-combining circuit 5.

The first diversity-combining circuit 5 diversity-synthesizes the first decoded data symbol and decoded data symbols generated by other similar circuits (step (4) of FIG. 5). It is then determined whether or not the number of input signals used in the diversity-combining operation is greater than the specified number of branches (step (5) of FIG. 5). If the number of input signals is greater than the specified number of branches, an output of the first diversity-combining circuit 5 is provided to the tentative determining circuit 6.

The tentative determining circuit 6 compares the first decoded data symbol output from the first diversity-combining circuit 5 with a predetermined threshold value so as to determine the first decoded data symbol as a predetermined discrete data symbol (step (6) of FIG. 5). The tentatively determined data symbol is output to the second propagation path estimation circuit 7 which uses the pilot symbol and the tentatively determined data symbol.

The second propagation path estimation circuit 7 regards the tentatively determined data symbol determined by the tentative determining circuit 6 as a pilot symbol, and estimates a propagation characteristic of the propagation path by a method similar to the method in which only the pilot signal is used to assume the propagation characteristic of the propagation path (step (7) of FIG. 5).

That is, the estimated propagation characteristic $\xi^{\wedge}$ of the propagation path at a position where the data symbol is received is obtained by multiplying the received data symbol $X \cdot \xi$ a complex conjugate $X^*$ of the tentatively determined data symbol $X$ determined by the tentative determining circuit.

The second propagation estimation circuit 7 calculates a second estimated characteristic $\xi 2^{\wedge}$ of the propagation path based on the estimated propagation characteristic $\xi^{\wedge}$ which was estimated from the tentatively determined data symbol and the estimated propagation characteristic $\xi 1^{\wedge}$ which was estimated from the pilot symbol. The second propagation path estimation circuit 7 outputs a complex conjugate $\xi 2^{\wedge *}$ to the second multiplier 9.

The second multiplier 9 performs a synchronism detection by multiplying the complex conjugate $\xi 2^{\wedge *}$ of the second estimated characteristic by the received data symbol from the second delay circuit 8 (refer to step (8) of FIG. 5). Then, the second multiplier 9 outputs a second decoded data symbol having a reduced influence of the propagation characteristic of the propagation path to the second diversity-combining circuit 10.

The second diversity-combining circuit 10 diversity-synthesizes the second decoded data symbol from the second multiplier 9 and decoded data symbols generated by other similar circuits (refer to step (9) of FIG. 5). It is then determined whether or not the number of input signals used in the diversity-combining operation is greater than the specified number of branches (refer to step (10) of FIG. 5). If the number of input signals is greater than the specified number of branches, an output of the second diversity-combining circuit 10 is provided to the final determining circuit 11.

The final determining circuit 11 compares the second decoded data symbol output from the second diversity-combining circuit 10 with a predetermined threshold value so as to determine the first decoded data symbol as a predetermined discrete data symbol (refer to step (11) of FIG. 5). The determined data symbol is output to the decoder 12 (refer to step (12) of FIG. 5).

Figure 6:
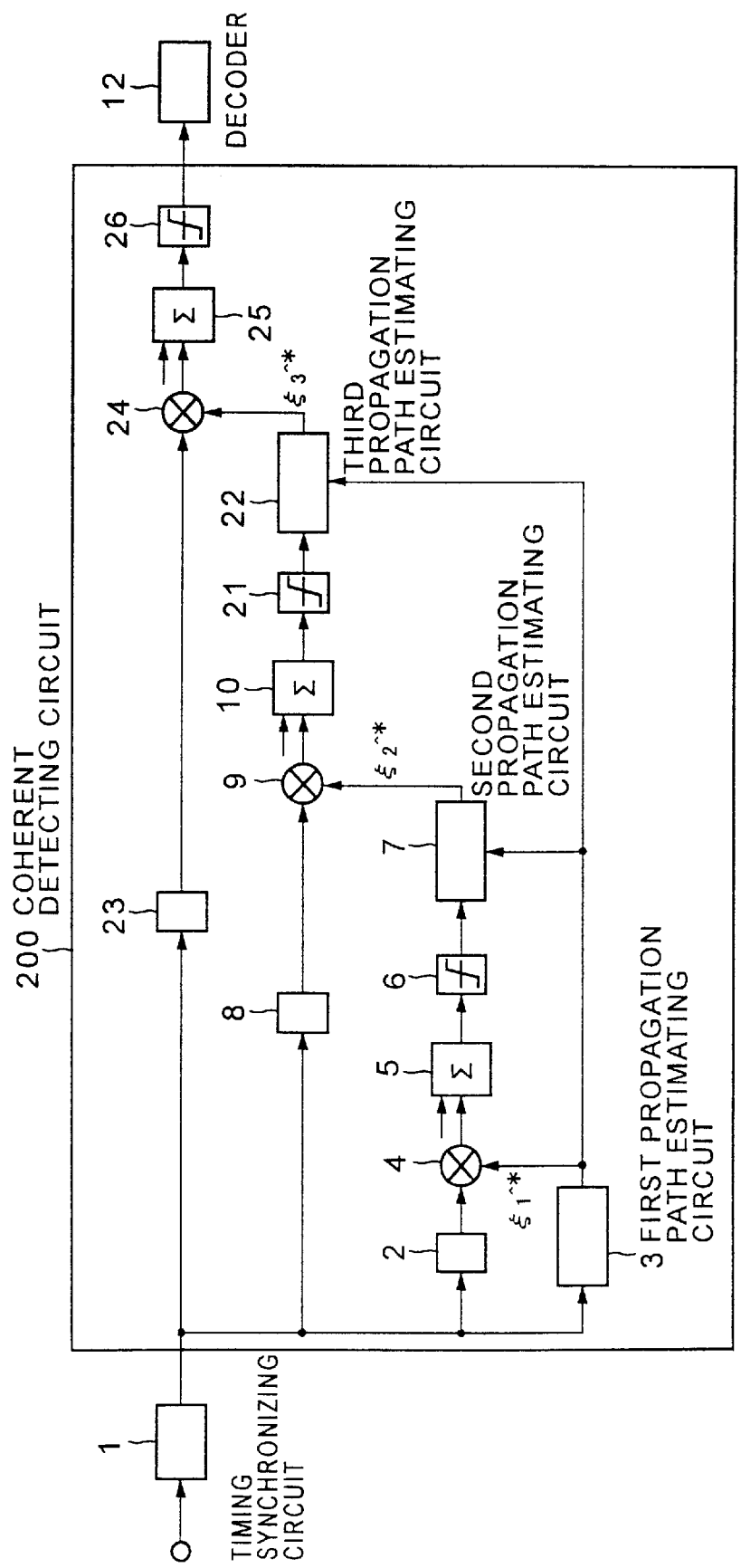
FIG. 6 is a block diagram of a coherent detecting circuit according to a second embodiment of the present invention.

A description will now be given of a second embodiment of the present invention. FIG. 6 is a block diagram of a coherent detecting circuit 200 according to a second embodiment of the present invention. In FIG. 6, parts that are the same as the parts shown in FIG. 4 are given the same reference numerals, and descriptions thereof will be omitted.

The coherent detecting circuit 200 shown in FIG. 6 comprises, in addition to the parts 2 to 11 shown in FIG. 4, a second tentative determining circuit 21, a third propagation path estimation circuit 22 using a pilot symbol and a tentatively determined data symbol, a third delay circuit 23, a third multiplier 24, a third diversity-combining circuit 25 and a final determining circuit 26.

The coherent detecting circuit 200 according to the second embodiment performs tentative determination twice by the first tentative determining circuit 6 and the second tentative determining circuit 21.

The first tentative determining circuit 6 performs a tentative determination based on the estimated propagation characteristic $\xi 1^{\wedge}$ obtained from the pilot symbol. Additionally, the second tentative determining circuit 21 performs another tentative determination based on the estimated propagation characteristic $\xi 2^{\wedge}$ obtained from the pilot symbol and the tentatively determined data symbol. The third propagation path estimation circuit 22 produce a complex conjugate $\xi 3^{\wedge *}$ of a third propagation characteristic based on the tentatively determined data symbol from the second tentative determining circuit 21 and the pilot symbol.

The third multiplier 24 obtains a third decoded data symbol by multiplying the received data symbol supplied through the third delay circuit 23 by the complex conjugate $\xi 3^{\wedge *}$ of the third estimated propagation characteristic. The third decoded data symbol is output to the third diversity-combining circuit 25.

The third diversity-combining circuit 25 diversity-synthesizes the third decoded data symbol supplied by the third multiplier 24 and decoded data symbols generated by other similar circuits, and outputs the result to the final determining circuit 26.

In the first and second embodiments according to the present invention, since the number of the diversity-combining circuits is the same as the number of the determining circuits, a large improvement can be obtained by performing a diversity-combining by each diversity-combining circuit.

As mentioned above, according to the first and second embodiments of the present invention, since the tentatively determining data symbol after the tentative determination is used in the same way as the pilot symbol, accuracy of assumption of the propagation characteristic of the propagation path can be increased.

However, as mentioned above, when the tentatively determined data symbol is used as a pilot symbol, the number of the tentatively determined data symbols to be used for the assumption and positions thereof must be appropriately selected in response to a degree of change in the fading frequency.

A description will now be given of the number of the tentatively determined data symbols used for estimating the propagation characteristic of the propagation path and positions thereof.

Figure 7:
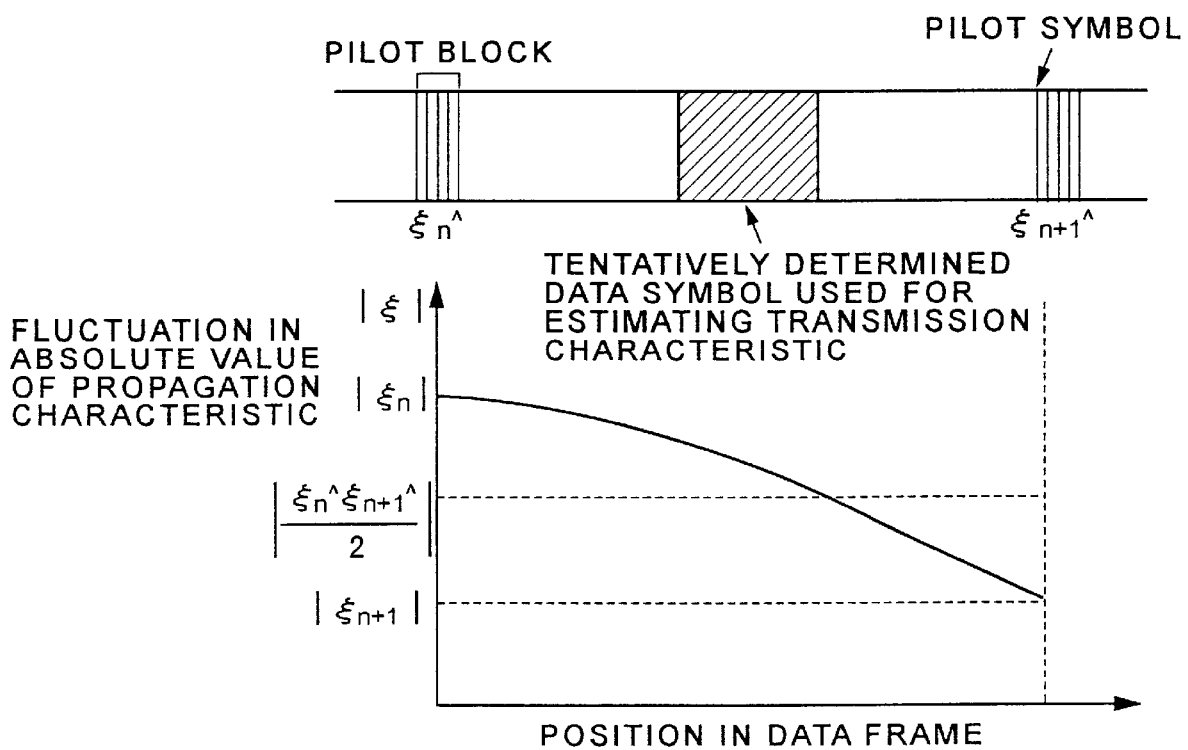
FIG. 7 is an illustration for explaining tentatively determined data symbols used for estimating a propagation characteristic.

FIG. 7 is an illustration for explaining the tentatively determined data symbols used for estimating the propagation characteristic of the propagation path. FIG. 6 shows a relationship between positions in the data frame and fluctuation in an absolute value of the propagation characteristic of the propagation path. Although the propagation characteristic of the propagation path is actually a complex, only an absolute value is shown in the figure and a phase is omitted for the sake of simplification. It should be noted that the phase also fluctuates according to a position in the data frame.

In FIG. 7, the actual value and the estimated value of the propagation characteristic of the propagation path in the n-th pilot block are represented by $\xi n$ and $\xi n^{\wedge}$, respectively. Additionally, the actual value and the estimated value of the propagation characteristic of the propagation path in the (n+1)-th pilot block are represented by $\xi n+1$ and $\xi n+1^{\wedge}$, respectively.

When the estimated value of the propagation characteristic at a position in a data symbol string between two pilot blocks shown in FIG. 7 is rendered to be an average of the estimated values $\xi n^{\wedge}$ and $\xi n+1^{\wedge}$ in the two pilot blocks, all of the data symbols between the pilot symbols in the two pilot blocks are decoded by using the same estimated value of the propagation characteristic, and are subjected to a tentative determination after being diversity-synthesized.

If a difference between the actual values $\xi n$ and $\xi n+1$ of the two pilot blocks is small, a significant difference is not generated when a tentatively determined data symbol at any position in the data symbol string is used. Thus, a good accuracy can be obtained for estimating the propagation characteristic at any position in the data symbols.

However, if the difference between actual values $\xi n$ and $\xi n+1$ of the propagation characteristic of the propagation path is large, a large difference is generated between the estimated value and the actual value near an end of the data symbol string.

Accordingly, if a tentatively determined data symbol near an end of the data symbol string is used for estimating the propagation characteristic of the propagation path, an error rate of the tentative determination is increased which results in deterioration of accuracy in the assumption of the propagation characteristic of the propagation path.

However, an accurate assumption of the propagation characteristic can be obtained by using a tentatively determined data symbol in the middle of the data symbol string even when a large fluctuation occurs in the propagation characteristic of the propagation path. This is because the tentatively determined data symbol in the middle of the data symbol string has a small difference between the actual value and the estimated value which is an average of the estimated values $\xi n^{\wedge}$ and $\xi n+1^{\wedge}$ in the two pilot blocks.

Figure 8:
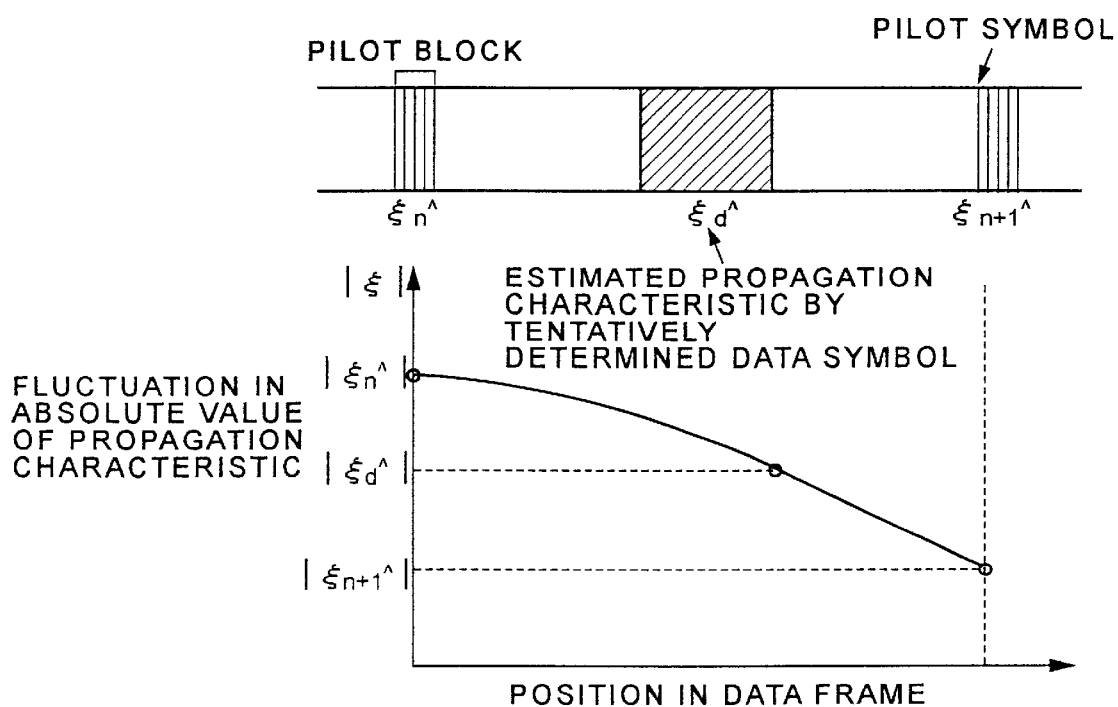
FIG. 8 is an illustration for explaining an estimated value of the propagation characteristic based on a tentatively determined data symbol.

FIG. 8 is an illustration for explaining the estimated value of the propagation characteristic based on the tentatively determined data symbol. FIG. 8 shows a relationship between positions in the data frame and fluctuation in an absolute value of the propagation characteristic of the propagation path. Similar to FIG. 7, although the propagation characteristic of the propagation path is actually a complex, only an absolute value is shown in the figure and a phase is omitted for the sake of simplification. Additionally, similar to FIG. 7, the actual value and the estimated value of the propagation characteristic of the propagation path in the n-th pilot block are represented by $\xi n$ and $\xi n^{\wedge}$, respectively, and the actual value and the estimated value of the propagation characteristic of the propagation path in the (n+1)-th pilot block are represented by $\xi n+1$ and $\xi n+1^{\wedge}$, respectively.

In FIG. 8, the estimated value of the propagation path obtained from the tentatively determined data symbol according to the first embodiment or the second embodiment of the present invention is represented by $\xi d^{\wedge}$.

As mentioned above, the propagation characteristic of the propagation path at a position in the data symbol string between the two pilot blocks is obtained from the estimated values $\xi n^{\wedge}$ and $\xi n+1^{\wedge}$ of the propagation characteristic in the two pilot blocks. If the fading frequency is high and a fluctuation of the propagation characteristic is large, the conventional system can only obtain the estimated value of the propagation characteristic at a position in the data symbol string by a linear interpolation using only the estimated values $\xi n^{\wedge}$ and $\xi n+1^{\wedge}$ of the propagation characteristic in the two pilot blocks. However, in the first and second embodiments of the present invention, the estimated value $\xi d^{\wedge}$ of the propagation characteristic based on the tentatively determined data symbol can be used for the interpolation. That is, the linear interpolation can be performed by using the three estimated values $\xi n^{\wedge}$, $\xi n+1^{\wedge}$ and $\xi d^{\wedge}$. Accordingly, the propagation characteristic of the propagation path at a position in the data symbol string can be estimated with high accuracy.

Additionally, by using three estimated values, a two-dimensional interpolation or a three-dimensional interpolation can be used. It should be noted that although FIG. 8 shows the interpolation with respect to only an amplitude component, a similar interpolation can be performed with respect to a phase component.

Figure 9:
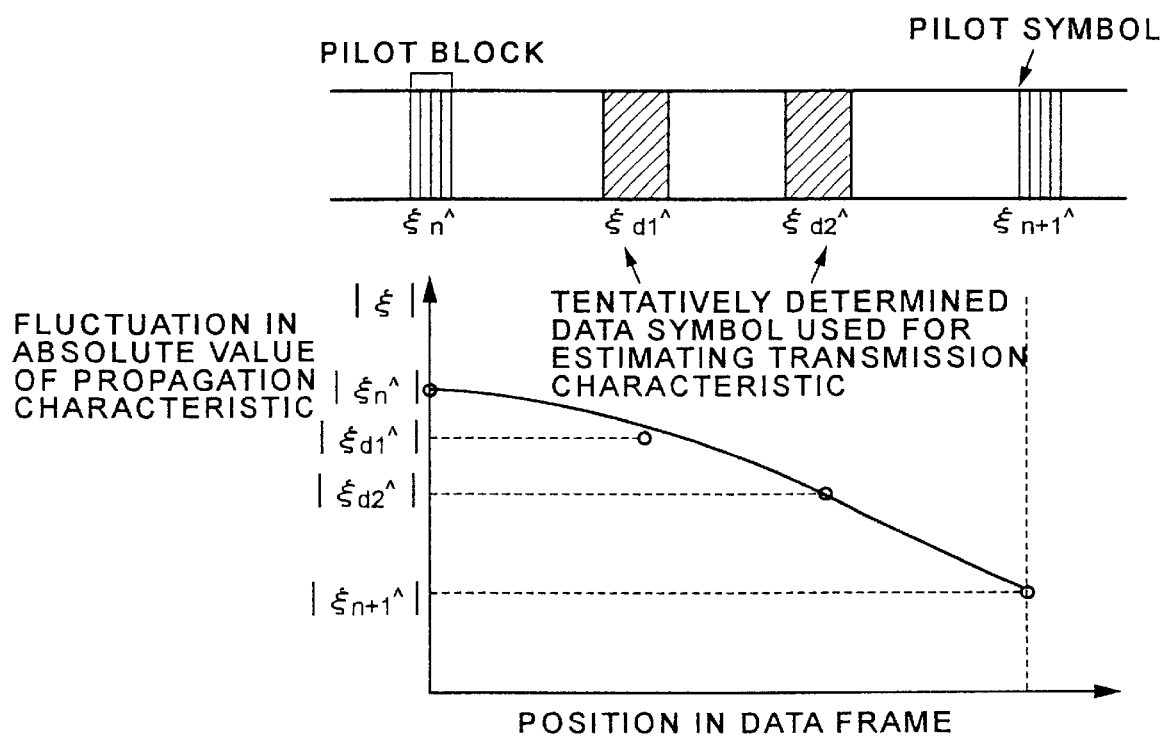
FIG. 9 is an illustration for explaining the estimated value of the propagation characteristic based on a plurality of tentatively determined data symbols.

FIG. 9 is an illustration for explaining the estimated value of the propagation characteristic based on a plurality of tentatively determined data symbols. FIG. 9 shows a relationship between positions in the data frame and fluctuation in an absolute value of the propagation characteristic of the propagation path. Similar to FIG. 7, although the propagation characteristic of the propagation path is actually complex, only an absolute value is shown in the figure and a phase is omitted for the sake of simplification. Additionally, similar to FIG. 7, the actual value and the estimated value of the propagation characteristic of the propagation path in the n-th pilot block are represented by $\xi n$ and $\xi n\hat{}$, respectively, and the actual value and the estimated value of the propagation characteristic of the propagation path in the (n+1)-th pilot block are represented by $\xi n+1$ and $\xi n+1\hat{}$, respectively.

In FIG. 9, the estimated values of the propagation path obtained from the tentatively determined data symbols according to the first embodiment or the second embodiment of the present invention are represented as $\xi d1\hat{}$ and $\xi d2\hat{}$.

In FIG. 9, the interpolation is performed by using the plurality of estimated values in addition to the estimated values $\xi n\hat{}$ and $\xi n+1\hat{}$ obtained in the pilot blocks. Thereby, the propagation characteristic of the propagation path at a position in the data symbol string can be estimated with high accuracy.

It should be noted that FIG. 9 shows an example in which the interpolation is performed by using four points including two points corresponding to the tentatively determined data symbols. However, a larger number of points may be used to increase the accuracy in the assumption. Additionally, although FIG. 9 shows the interpolation with respect to only an amplitude component, a similar interpolation can be performed with respect to a phase component.

Figure 10:
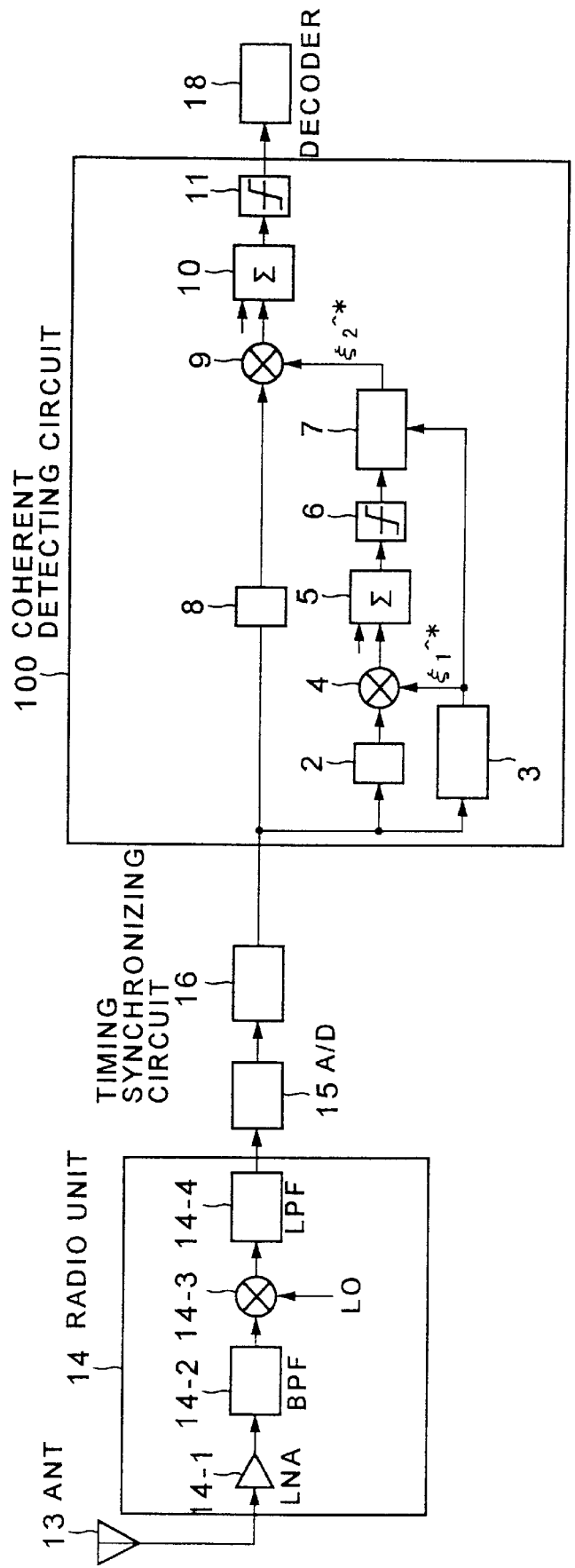
FIG. 10 is a block diagram of a receiver of a mobile communication system which uses the first embodiment of the present invention.

The first and second embodiments of the present invention can be applied to a receiver of a mobile communication system. FIG. 10 is a block diagram of a receiver of a mobile communication system which uses the coherent detecting circuit 100 according to the first embodiment of the present invention.

Figure 2:
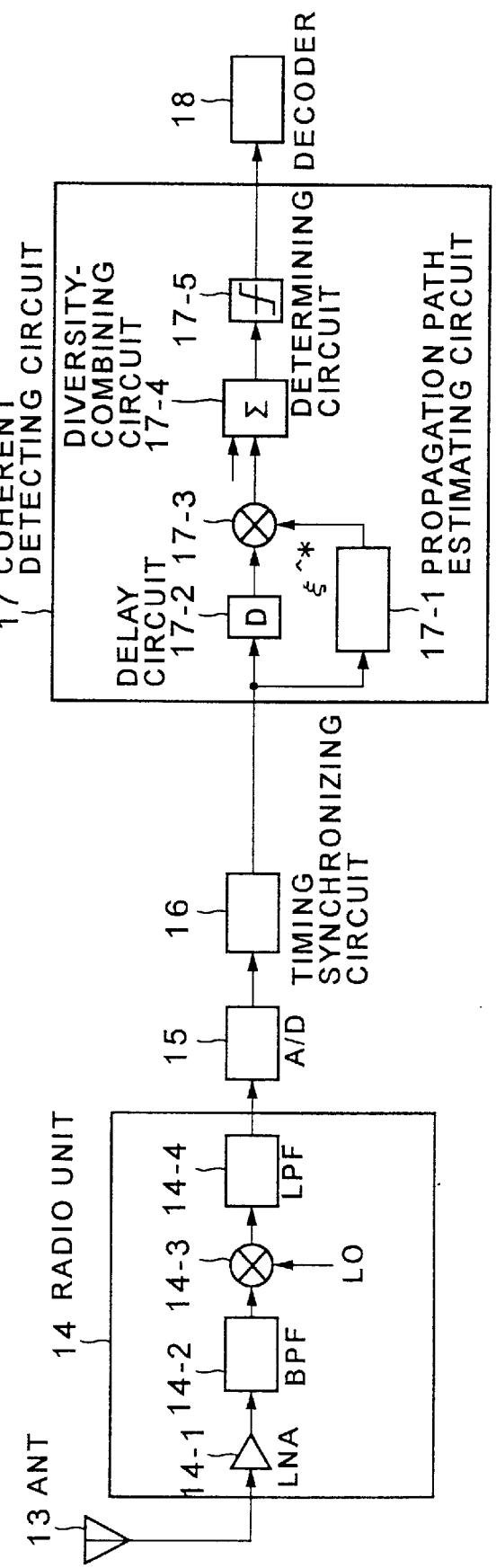
FIG. 2 is a block diagram of a receiver including a conventional coherent detecting circuit using a pilot symbol provided in a data frame of data symbols.

The receiver shown in FIG. 10 comprises an antenna, a radio unit, an A/D converter, a timing circuit synchronizing circuit and a decoder that are the same as the antenna 13, the radio unit 14, the A/D converter circuit 15, the timing synchronizing circuit 16 and the decoder 18 provided in the conventional system shown in FIG. 2. Thus, corresponding parts are given the same reference numerals, and descriptions thereof will be omitted. Additionally, the receiver comprises the coherent detecting circuit 100 according to the first embodiment of the present invention shown in FIG. 4. Thus, parts that are the same as the parts of the coherent detecting circuit 100 are given the same reference numerals, and descriptions thereof will be omitted.

Figure 11:
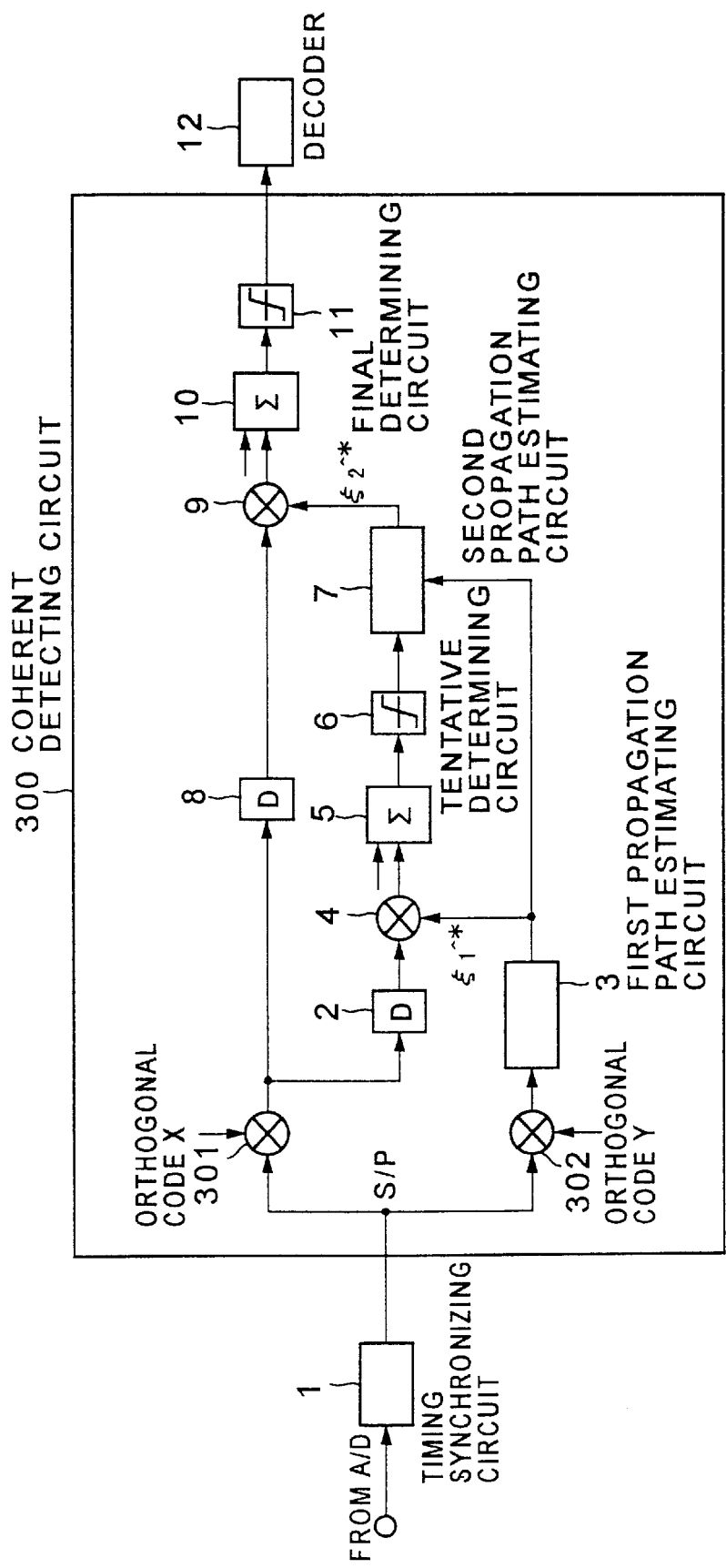
FIG. 11 is a block diagram of a coherent detecting circuit according to a third embodiment of the present invention.

A description will now be given of a third embodiment of the present invention. FIG. 11 is a block diagram of a coherent detecting circuit 300 according to the third embodiment of the present invention. In FIG. 11, parts that are the same as the parts shown in FIG. 4 are given the same reference numerals, and descriptions thereof will be omitted. The structure shown in FIG. 11 corresponds to a part after the received signal is converted into a base bandwidth and subjected to an A/D conversion. A structure of a radio part is the same as that of the conventional system shown in FIG. 2 and 3.

As shown in FIG. 11, the coherent detecting circuit 300 according to the third embodiment of the present invention comprises code multipliers 301 and 302 each of which multiplies a received signal by an orthogonal code, a first delay circuit 2 connected to the code multiplier 301, a first propagation path estimation circuit 3 using a pilot symbol, a first multiplier 4, a first diversity-combining circuit 5, a tentative determining circuit 6, a second propagation path estimation circuit 7 using a pilot symbol and a tentatively determined data symbol, a second delay circuit 8, a second multiplier 9, a second diversity-combining circuit 10 and a final determining circuit 11 connected to a decoder 12.

The received signal after being A/D converted is input to the timing synchronizing circuit 1 so that time positions of the pilot symbol and the data symbol are specified. Then, the received signal of a base bandwidth is input to the coherent detecting circuit 300. The received signal includes the data symbol and the pilot symbol that are multiplexed according to orthogonal codes. The received signal is separated into the data symbol and the pilot symbol by being multiplied by orthogonal codes X and Y by the code multipliers 301 and 302, respectively.

The code multiplier 301 multiplies the received signal by the orthogonal code X so as to output the data symbol. The code multiplier 302 multiplies the received signal by the orthogonal code Y so as to output the pilot symbol.

The data symbol output from the code multiplier 301 is input to the first delay circuit 2 and the second delay circuit 8. The first delay circuit 2 provides a time delay to the input data symbol so as to allow the first propagation path estimation circuit 3 to perform an operation for estimating a propagation path according to the pilot symbol. Then, the delayed data symbol is input to the first multiplier 4.

On the other hand, the pilot symbol output from the code multiplier 302 is input to the first propagation path estimation circuit 3. The first propagation path estimation circuit 3 estimates a characteristic of the propagation path by performing a calculation according to the above-mentioned equation (3). The first propagation path estimation circuit 3 outputs a conjugate complex $\xi 1\hat{}*$ of the estimated value $\xi 1\hat{}$ to the first multiplier 4 and the second propagation path estimation circuit 7.

The first multiplier 4 multiplies the output of the first delay circuit 2 by the complex conjugate $\xi 1\hat{}*$ of the estimated value $\epsilon 1\hat{}$ so as to demodulate the data symbol. An output of the first multiplier 4 is diversity-synthesized by the diversity-combining circuit 5, and an output of the diversity-combining circuit 5 is tentatively determined as a data symbol.

If the tentatively determined data symbol does not include errors, the tentatively determined data symbol after the tentative determination can be used as equal to the real data symbol. Accordingly, by using such a data symbol, an accuracy of assumption of the characteristic of the propagation path can be improved.

The second propagation path estimation circuit 7 estimates an estimated propagation characteristic by using the tentatively determined data symbol supplied by the tentative determining circuit 6. Then, the second propagation path estimation circuit 7 obtain an estimated value $\xi 2\hat{}$ based on the estimated propagation characteristic and the above-mentioned estimated value $\xi 1\hat{}$. The estimated value $\xi 2\hat{}$ is obtained as an accurate value for each of small sections according to a moving average.

Then, the data symbol is demodulated by the second multiplier 9 by using the accurate estimated value $\xi 2\hat{}$. The demodulated data symbol is subjected to a diversity-combining by the diversity-combining circuit 12. Thereafter, a final determination is performed by the final determination circuit 11. The finally determined data symbol is output to the decoder 12 so as to be decoded.

Figure 12:
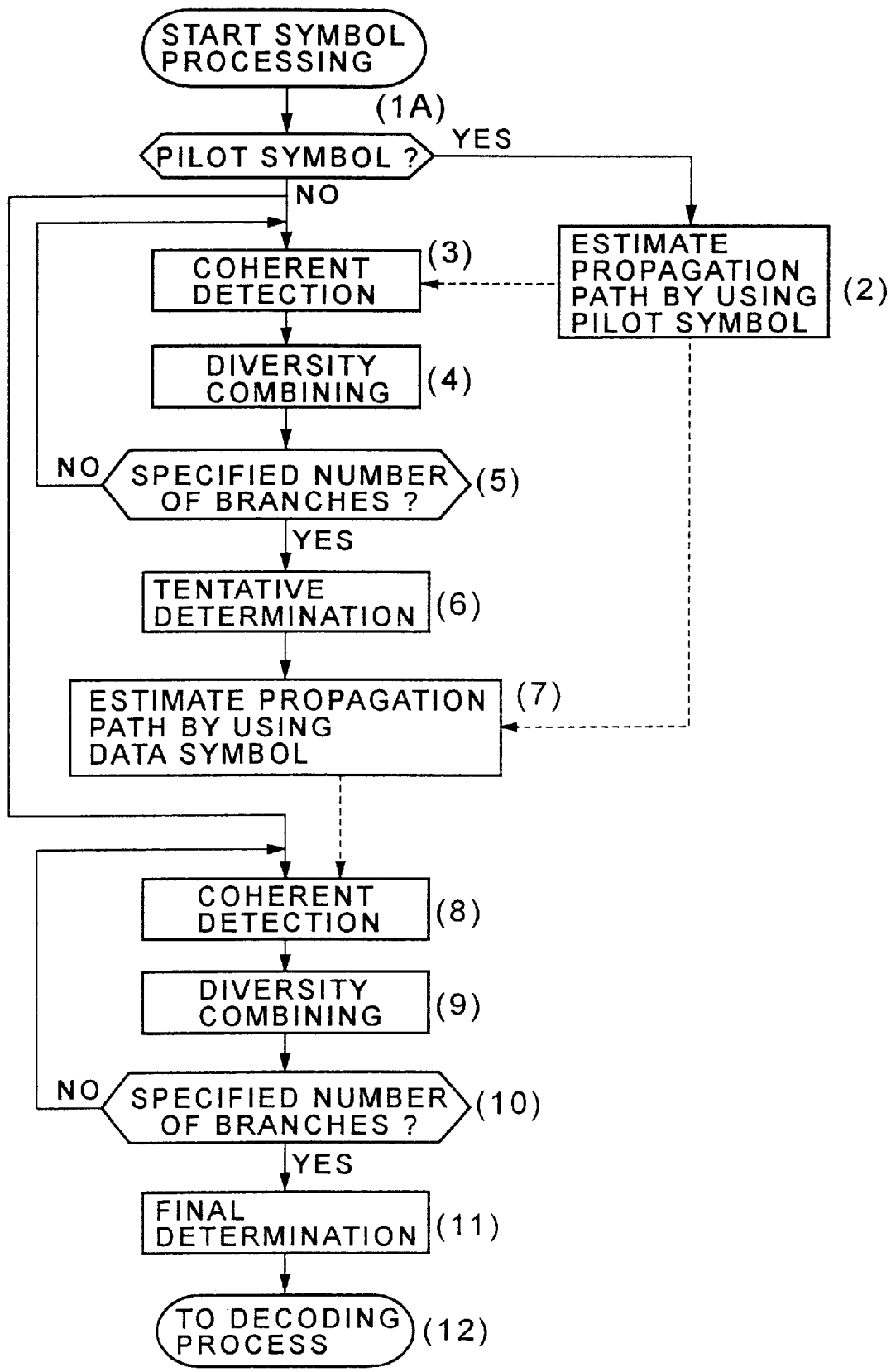
FIG. 12 is a flowchart of an operation of the coherent detecting circuit shown in FIG. 11.

FIG. 12 is a flowchart of a procedure for detecting synchronism by the coherent detecting circuit 300 according to the third embodiment of the present invention. In FIG. 12, a parenthesized number indicates a process number. Additionally, in FIG. 12, each of the solid arrows indicates a flow of the procedure, and each of the dotted arrows indicates a flow of information during the procedure.

The procedure shown in FIG. 12 is the same as the procedure shown in FIG. 5 except for the process of step (1A), and steps the same as the steps shown in FIG. 5 are given the same step numbers and detailed descriptions thereof will be omitted.

When the procedure shown in FIG. 12 is started, the pilot symbol and the data symbol are separated by being multiplied by the orthogonal codes X and Y. Then, it is determined in step (1A) whether or not the pilot symbol is received. If it is determined that the pilot symbol is received, the procedure proceeds to step (2). Otherwise, the procedure proceeds to step (3). In step (2), a propagation characteristic of the propagation path is estimated based on the received pilot symbol. In step (3), a synchronism detection is performed by multiplying the data symbol by the assume value of the propagation characteristic obtained in step (2). In step (4), a diversity-combining is performed. Then, it is determined, in step (5), whether or not a number of input signals for the diversity-combining is greater than a number of specified branches. If the number of input signals is greater than the number of specified branches, the procedure proceeds to step (6). Otherwise, the procedure returns to step (3). In step (6), a tentative determination is made for the data symbol. Then, in step (7), an estimated value of the propagation characteristic of the propagation path is obtained based on the estimated value obtained in step (6) and the estimated value obtained in step (2).

Thereafter, in step (8), a synchronism detection is performed by multiplying the data symbol by the estimated value of the propagation characteristic obtained in step (7). In step (9), a diversity-combining is performed. Then, it is determined, in step (10), whether or not a number of input signals for the diversity-combining is greater than the number of specified branches. If the number of input signals is greater than the number of specified branches, the procedure proceeds to step (11). Otherwise, the procedure returns to step (8). In step (11), a final determination is made for the data symbol.

As mentioned above, according to the present embodiment, the data symbol that is demodulated and determined from the pilot symbol is estimated to be a pilot symbol so as to assume the propagation characteristic of the propagation path based on the data symbol estimated to be a pilot symbol. Accordingly, if a fluctuation in the propagation characteristic is large, that is, if a fading frequency is high, a more accurate estimated value of the propagation characteristic can be obtained than that obtained by the conventional method which uses only pilot symbols to determine the propagation characteristic.

Figure 13:
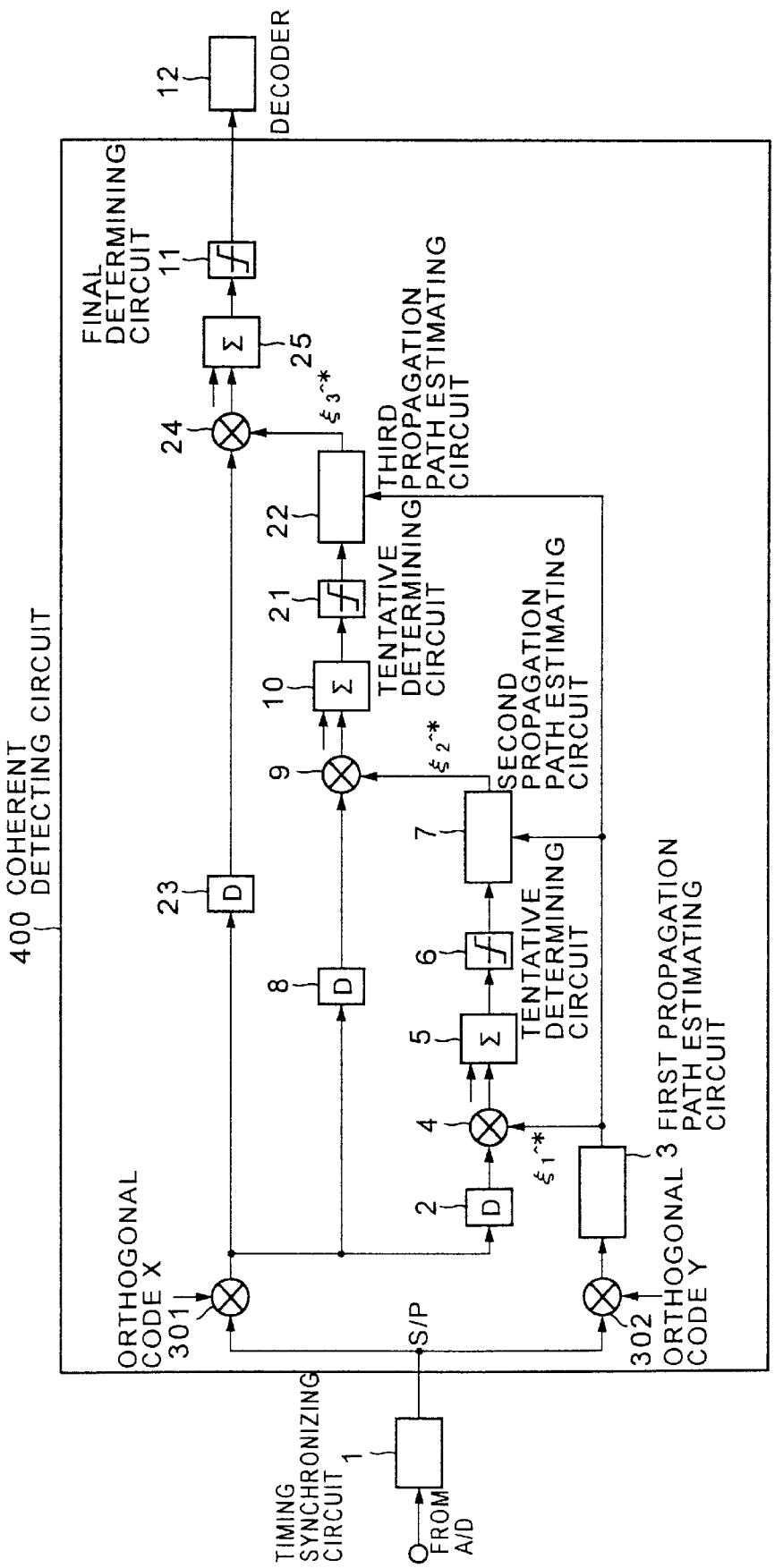
FIG. 13 is a block diagram of a coherent detecting circuit according to a fourth embodiment of the present invention.

A description will now be given of a fourth embodiment of the present invention. FIG. 13 is a block diagram of a coherent detecting circuit 400 according to the fourth embodiment of the present invention. In FIG. 13, parts that are the same as the parts shown in FIG. 11 are given the same reference numerals, and descriptions thereof will be omitted.

In the coherent detecting circuit 400 according to the present embodiment, a tentative determination for the data symbol is performed twice so as to increase a more accurate estimated value of the propagation characteristic. It should be noted that the number of tentative determinations is not limited to two, and a greater number of tentative determinations may be performed so as to further increase the accuracy.

The coherent detecting circuit 400 shown in FIG. 13 comprises, in addition to the parts 2 to 11 shown in FIG. 11, a second tentative determining circuit 21, a third propagation path estimation circuit 22 using a pilot symbol and a tentatively determined data symbol, a third delay circuit 23, a third multiplier 24, a third diversity-combining circuit 25 and a final determining circuit 26.

The coherent detecting circuit 400 according to the fourth embodiment performs a tentative determination twice, first by the first tentative determining circuit 6 and then by the second tentative determining circuit 21.

The first tentative determining circuit 6 performs a tentative determination based on the estimated propagation characteristic $\xi1\hat{}$ obtained from the pilot symbol. Additionally, the second tentative determining circuit 21 performs another tentative determination based on the estimated propagation characteristic $\xi2\hat{}$ obtained from the pilot symbol and the tentatively determined data symbol. The third propagation path estimation circuit 22 estimates a propagation characteristic based on the tentatively determined data symbol obtained by the second tentative determining circuit 21 and the pilot symbol so as to obtain a third propagation characteristic $\xi3\hat{}$ based on the estimated value thereof and the estimated value $\xi1\hat{}$ by means of a moving average. Then, the third propagation path estimation circuit 22 produce a complex conjugate $\xi3\hat{}^*$ from the third propagation characteristic $\xi3\hat{}$.

The third multiplier 24 obtains a third decoded data symbol by multiplying the received data symbol supplied through the third delay circuit 23 by the complex conjugate $\xi3\hat{}^*$ of the third estimated propagation characteristic $\xi3\hat{}$. The third decoded data symbol is output to the third diversity-combining circuit 25.

The third diversity-combining circuit 25 diversity-synthesizes the third decoded data symbol supplied by the third multiplier 24 and decoded data symbols generated by other similar circuits, and outputs the result to the final determining circuit 11.

In the third and fourth embodiments according to the present invention, since the number of the diversity-combining circuits is the same as the number of the determining circuits, a large improvement can be obtained by performing a diversity-combining by each diversity-combining circuit.

As mentioned above, according to the third and fourth embodiments of the present invention, since the data symbol after the tentative determination is equally used as the pilot symbol, accuracy of assumption of the propagation characteristic of the propagation path can be increased.

However, when the estimated value $\xi2\hat{}$ (or $\xi3\hat{}$) of the propagation characteristic is obtained based on the estimated value $\xi1\hat{}$ which is based on the pilot symbol alone and the estimated value which is based on the tentatively determined data symbol, the pilot symbol is a definite value but the tentatively determined data symbol may include errors at a certain probability. Accordingly, the accuracy can be increased by using a weighted average of the pilot symbol and the tentatively determined data symbol according to a reliability of each symbol.

Figure 14:
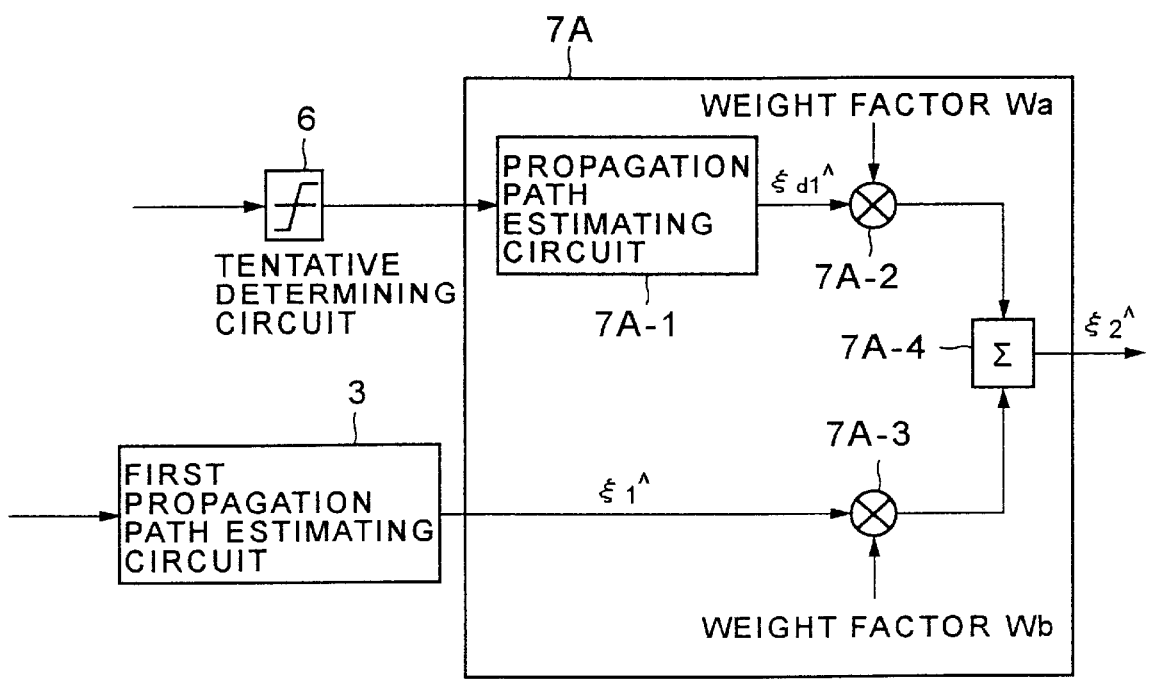
FIG. 14 is a block diagram of a variation of a second propagation path estimation circuit shown in FIGS. 11 and 13.

FIG. 14 is an example of a propagation path estimation circuit that uses a weighted average. The propagation path estimation circuit 7A shown in FIG. 14 is a variation of the second propagation path estimation circuit 7 shown in FIGS. 11 and 13. However, the structure of the transmission estimation circuit 7A may be applied to the third propagation path estimation circuit 22 shown in FIG. 13.

The propagation path estimation circuit 7A shown in FIG. 14 comprises: a propagation path estimation circuit 7A-1 which obtains an estimated value $\xi d1\hat{}$ of the propagation characteristic based on the tentatively determined data symbol; a multiplier 7A-2 which multiplies the estimated value $\xi d1\hat{}$ by a weight factor Wa; a multiplier 7A-3 which multiplies the estimated value $\xi1\hat{}$ supplied from the first propagation path estimation circuit 3 by a weight factor Wb; and a weighted average calculating circuit 7A-4.

According to the propagation path estimation circuit 7A, the weight value Wa applied to the estimated value $\xi d1\hat{}$ can be smaller than the weight value Wb applied to the estimated value $\xi1\hat{}$. Thus, the accuracy of the estimated value $\xi2\hat{}$ can be improved by obtaining a weighted average according to the thus-determined weight values Wa and Wb.

A ratio of the weight value Wa to the weight value Wb can be set according to an error rate in the tentatively determined data symbol, and thereby the accuracy of the estimated value $\xi 2^{\wedge}$ of the propagation path can be optimized. The error rate of the tentatively determined data symbol is automatically determined when an error rate of the finally determined data symbol is determined in accordance with a predetermined relationship. Accordingly, the error rate of the tentatively determined data symbol can be previously determined by performing a simulation.

Figure 15:
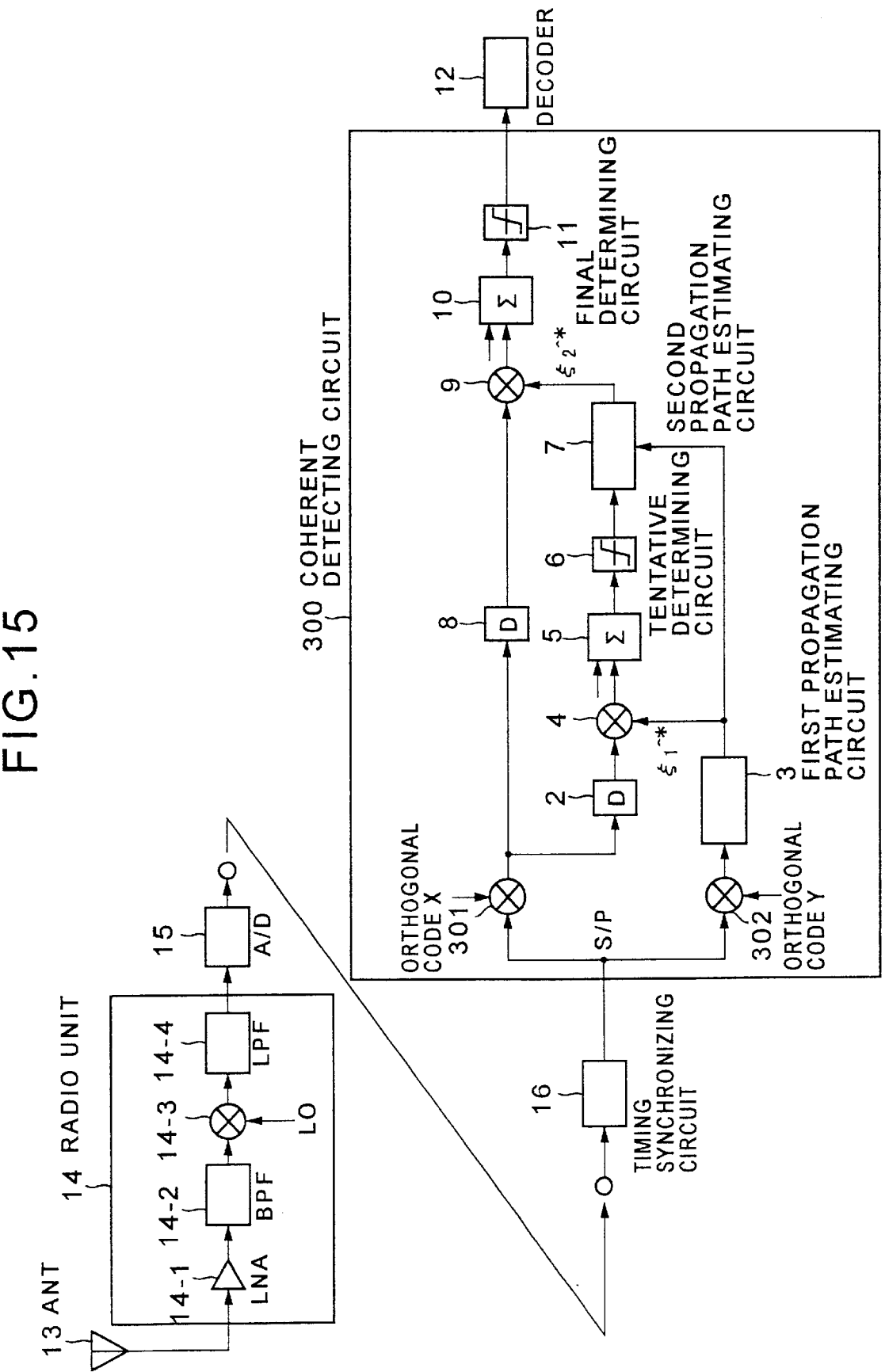
FIG. 15 is a block diagram of a receiver of a mobile communication system which uses the third embodiment of the present invention.

Similar to the first and second embodiments of the present invention, the third and fourth embodiments of the present invention can be applied to a receiver of a mobile communication system. FIG. 15 is a block diagram of a receiver of a mobile communication system which uses the coherent detecting circuit 300 according to the third embodiment of the present invention.

Figure 3:
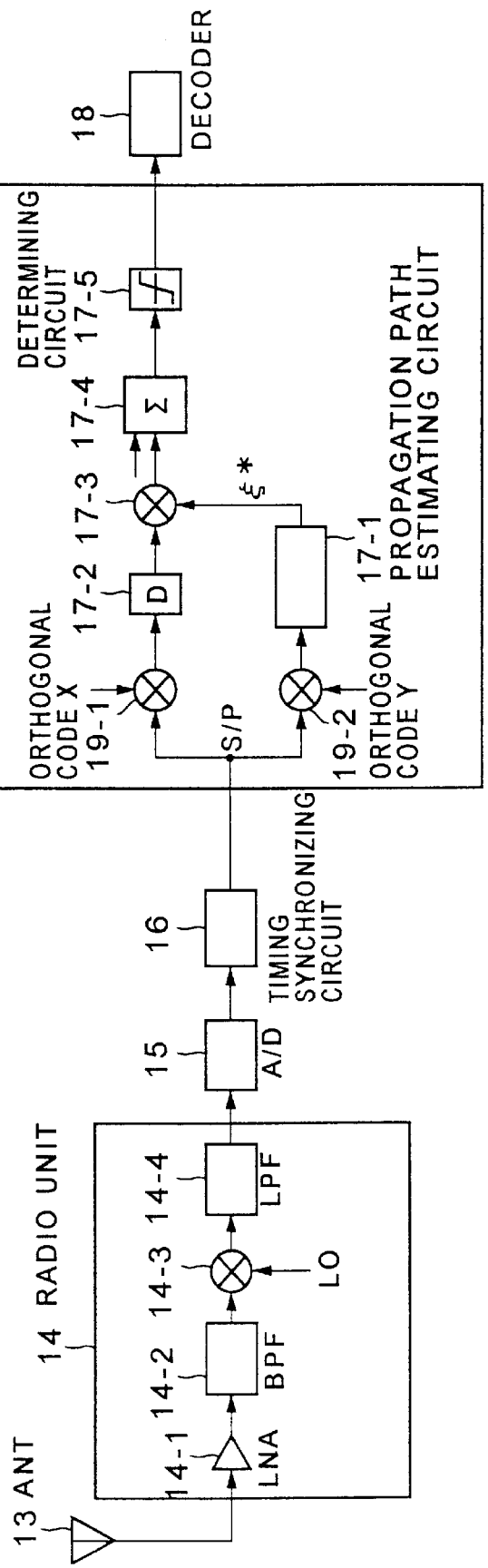
FIG. 3 is a block diagram of a receiver including a conventional coherent detecting circuit using pilot symbols concurrently transmitted with data symbols.

The receiver shown in FIG. 15 comprises an antenna, a radio unit, an A/D converter, a timing circuit synchronizing circuit and a decoder that are the same as the antenna 13, the radio unit 14, the A/D converter circuit 15, the timing synchronizing circuit 16 and the decoder 18 provided in the conventional system shown in FIG. 3. Thus, corresponding parts are given the same reference numerals, and descriptions thereof will be omitted. Additionally, the receiver comprises the coherent detecting circuit 300 according to the third embodiment of the present invention shown in FIG. 11. Thus, parts that are the same as the parts of the coherent detecting circuit 300 are given the same reference numeral, and descriptions thereof will be omitted.

Figure 16:
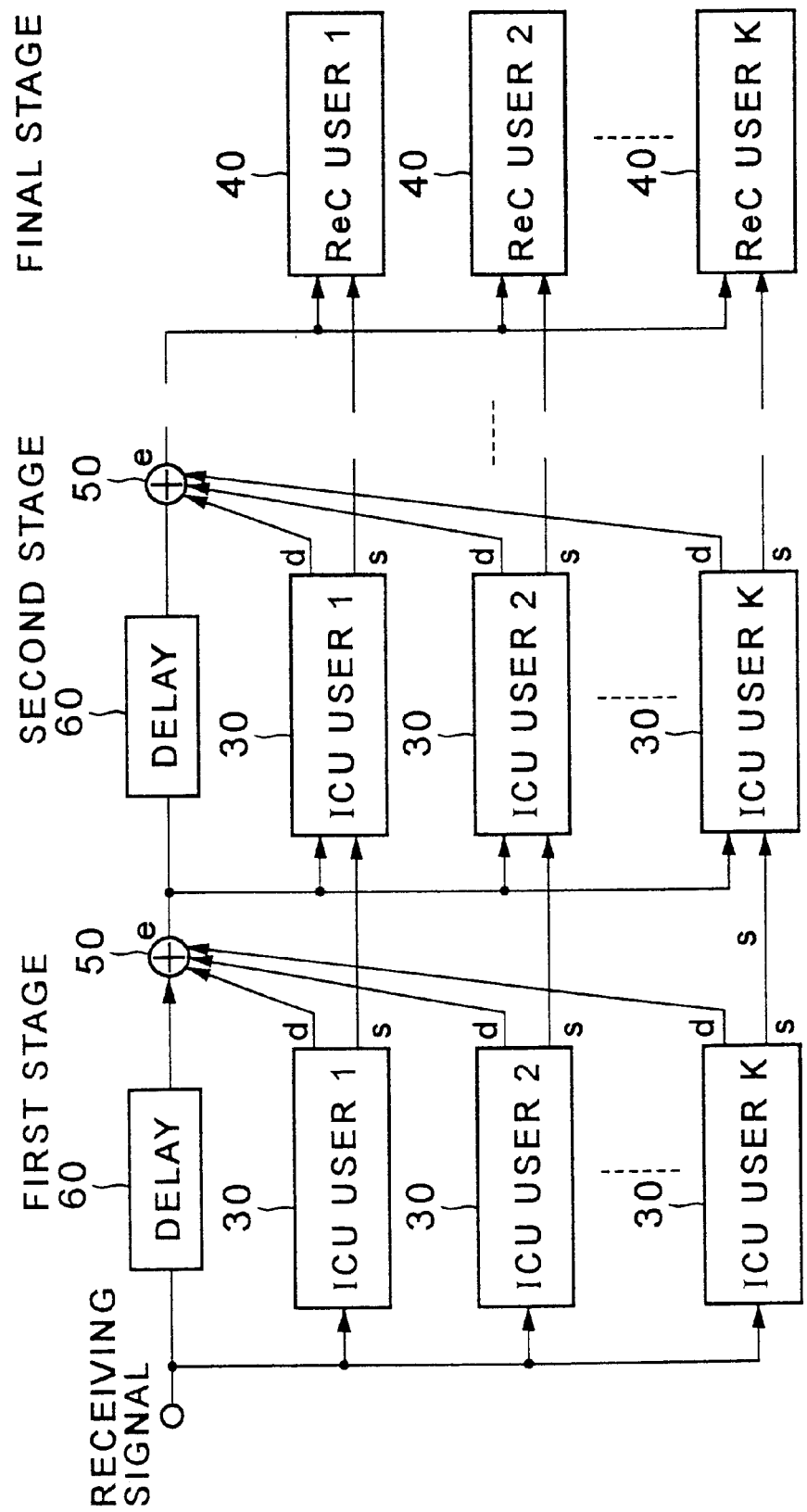
FIG. 16 is a block diagram of a multi-stage type interference removing apparatus which uses the first embodiment of the present invention.

Additionally, the first to fourth embodiments of the present invention can be applied to a multi-stage type interference eliminating apparatus. FIG. 16 is a block diagram of a multi-stage type interference-eliminating apparatus to which the present invention is applied. The multi-stage type interference eliminating apparatus shown in FIG. 16 is provided in a base station of a DS-CDMA mobile communication system so as to eliminate interference of other users (mobile stations).

The multi-stage type interference eliminating apparatus shown in FIG. 16 comprises a plurality of stages and a final stage. Each of the stages comprises a plurality of interference-replica generating units (ICU) 30, a synthesizer 50 and a delay circuit 60. The final stage comprises a plurality of receivers (ReC) 40.

Each of the interference replica generating units 30 is provided with an error signal e and an interference-replica signal from a preceding stage. Each of the interference replica generating units 30 performs a process for eliminating an interference, and outputs to a subsequent stage a remaining interference estimating signal d and a corrected interference replica signal s.

The synthesizer 50 in each of the stages synthesizes the remaining interference estimating signals d output from the interference replica generating units 30 provided in the same stage so as to produce a synthesized remaining interference replica signal. The synthesizer 50 then subtracts the synthesized remaining interference replica signal from an error signal which is supplied from the immediately preceding stage via the delay circuit 60 so as to output a new error signal to the subsequent stage.

By repeating the above-mentioned operation in each stage, the error signal approaches zero. Thus, an accuracy of the interference replica signal is increased. Additionally, an interference between users can be eliminated by a rake receiving process by using the error signal e and the interference replica signal obtained at the final stage. In the rake receiving process, the receiving data symbol corresponding to each multipath is multiplied by a complex conjugate of the estimated value of the propagation characteristic, and a maximum-ratio combining is performed for the signal on each propagation path by diversity-combining.

Figure 17A:
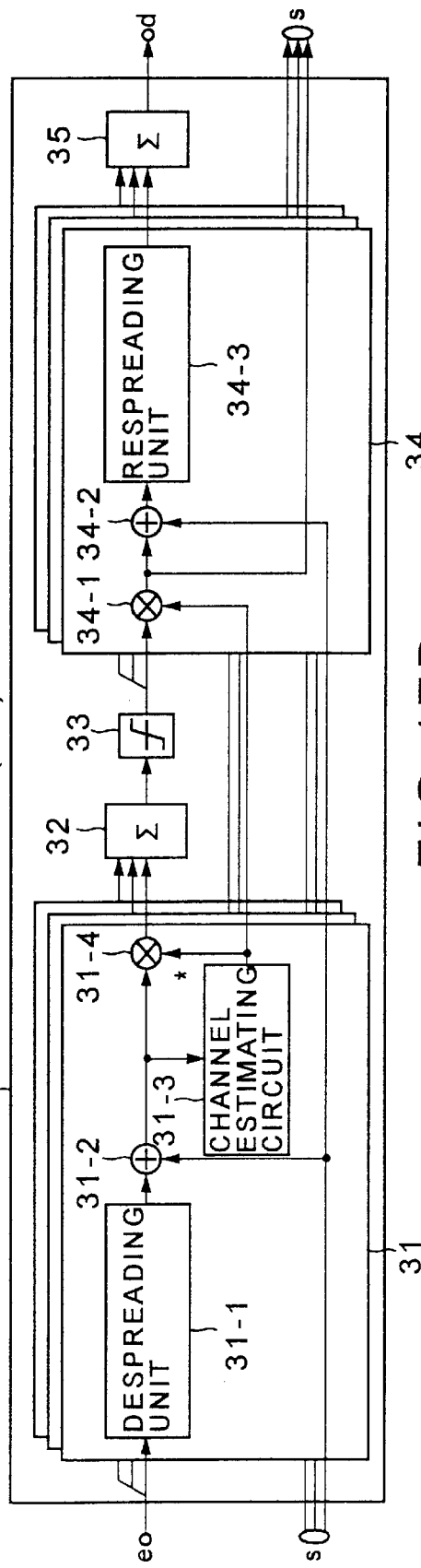
FIG. 17A is an illustration for explaining an interference replica generating unit.
Figure 17B:
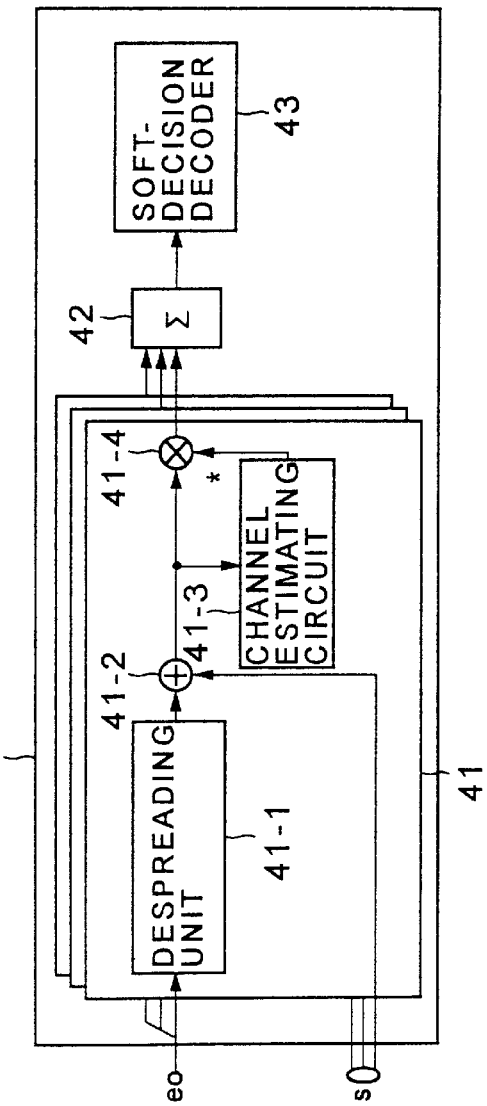
FIG. 17B is an illustration for explaining a receiver in a final stage.

FIG. 17A is an illustration for explaining the interference replica generating unit 30, and FIG. 17B is an illustration for explaining the receiver 40 in the final stage. Each of the interference replica generating units 30 is provided with despreading units 31 in response to the number of propagation paths. Each of the despreading units 31 comprises a reverse diffuser 31-1, an adder 31-2, a channel estimation circuit 31-3 and a multiplier 31-4. Similarly, each of the receivers 40 is provided with despreading units 41 in response to the number of propagation paths. Each of the despreading units 41 comprises a reverse diffuser 41-1, an adder 41-2, a channel estimation circuit 41-3 and a multiplier 41-4.

Figure 1:
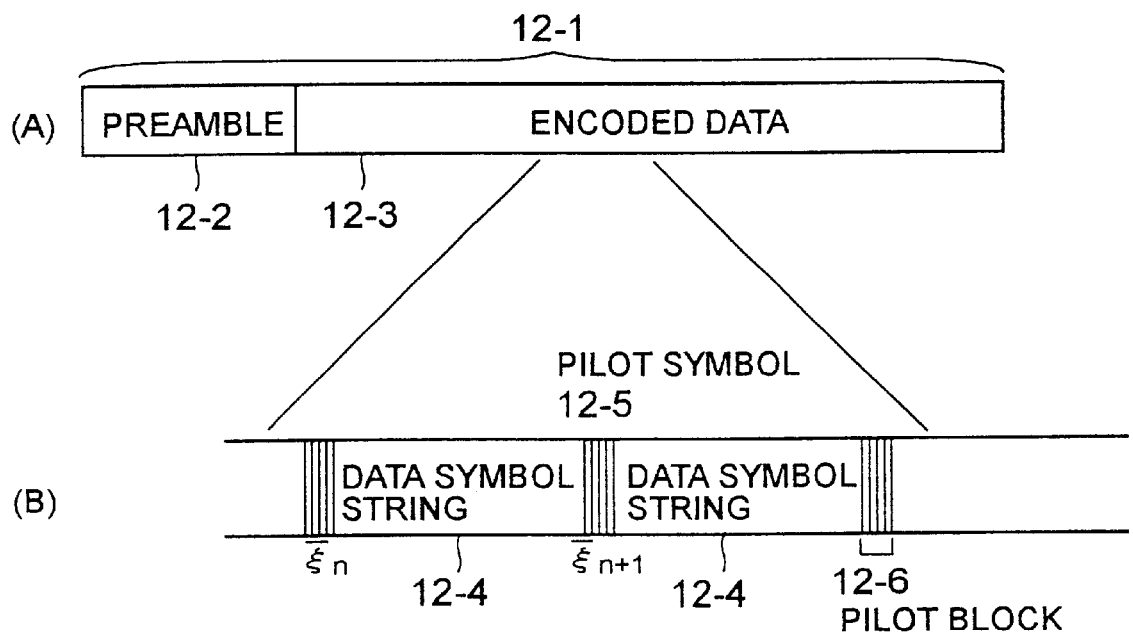
FIG. 1 is an illustration of a data frame provided with pilot symbols.

The error signal e and the interference replica signal s are input to each of the despreading units 31 and 41. The reverse diffusers 31-1 and 41-1 despread the error signal e. The adders 31-2 and 41-2 add the despread error signal to the interference replica signal s provided from the preceding stage. The signals obtained by the adders 31-2 and 41-2 may be equivalent to the signal having the data frame structure shown in FIG. 1.

The channel estimation circuits 31-3 and 41-3 assume a propagation characteristic of a propagation path (channel) from the signals output from the adders 31-2 and 41-2 by using the estimating method according to the first to fourth embodiments of the present invention which uses the pilot symbol and the tentative determination data symbol. Thus, an accurate assumption of the propagation characteristic of the propagation path can be obtained.

The output signals of the adders 31-2 and 41-2 are multiplied, by the respective multipliers 31-4 and 41-4, by complex conjugates of the estimated values of the propagation characteristic output from the channel estimation circuits 31-3 and 41-3. Outputs of the adders 31-2 and 41-2 are diversity-synthesized by the synthesizer 32 in the interference replica generating unit 30 or the synthesizer 42 in the receiver 40 of the final stage. An output of the synthesizer 32 in the interference replica generating unit 30 is tentatively determined by a tentative discriminator 33, and an output of the synthesizer 42 in the final stage 40 is soft-determined and decoded by a soft-decision decoder 43. The soft-decision is a determination in which a result of determination is output while maintaining an amplitude of the received data symbol.

In a respreading unit 34 of the interference replica generating unit 30, the output of the tentative discriminator 33 is multiplied by the output of the channel estimation circuit 31-3 by a multiplier 34-1. An output of the multiplier 34-1 is output to the subsequent stage as the interface replica signal s. Additionally, the output of the multiplier 34-1 is added to a signal obtained by reversing the sign of the interference replica signal s supplied from the preceding stage. An output of the adder 34-2 is spread by a respreader 34-3. An output of the respreading unit 34 is diversity-synthesized by a diversity synthesizer 35, and an output of the diversity synthesizer 35 is output to the subsequent stage as the remaining interference estimating signal d.

As mentioned above, the respreading unit 34 also uses the estimated value of the propagation characteristic of the propagation path which is estimated by the channel estimation circuit 31-3 when a multiplication is performed by the multiplier 34-1. Thus, an elimination of interface can be improved by improving the accuracy of assumption of the channel estimation circuit 31-3 by applying the method according to one of the first to fourth embodiments of the present invention.

Figure 18:
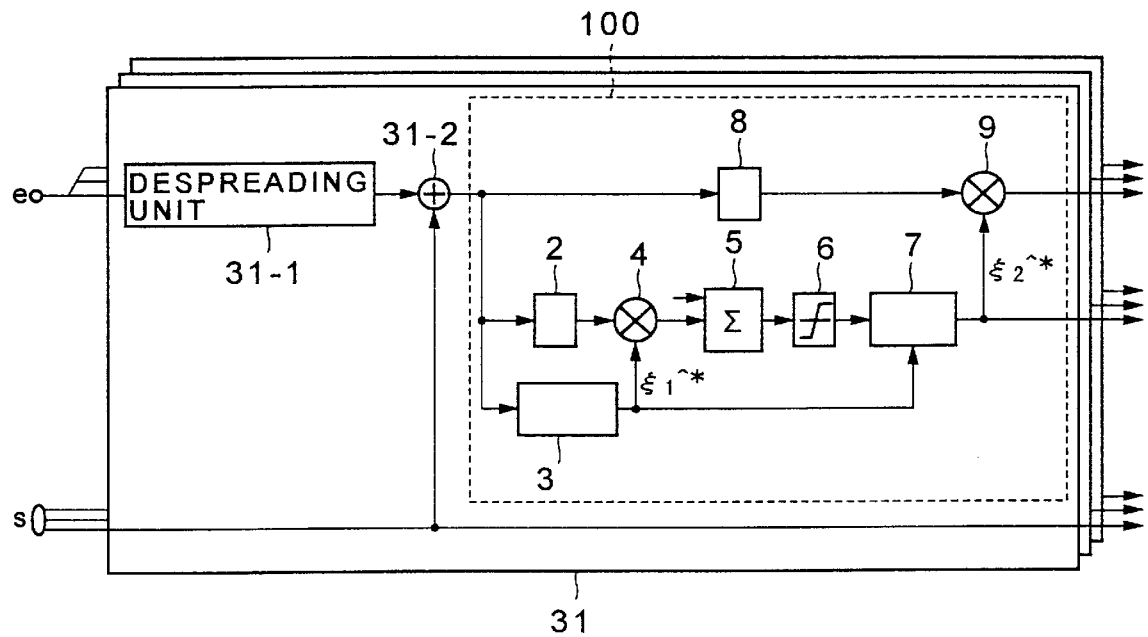
FIG. 18 is a block diagram of a despreading unit provided in each stage of the interference removing apparatus shown in FIG. 16.

FIG. 18 is a block diagram of the despreading unit 31 in which the coherent detecting circuit 100 according to the first embodiment of the present invention is incorporated. In FIG. 18, a part encircled by dotted lines is the same as the coherent detecting circuit 100 according to the first embodiment of the present invention. Thus, the same reference numerals are give, and a description thereof will be omitted.

Figure 19:
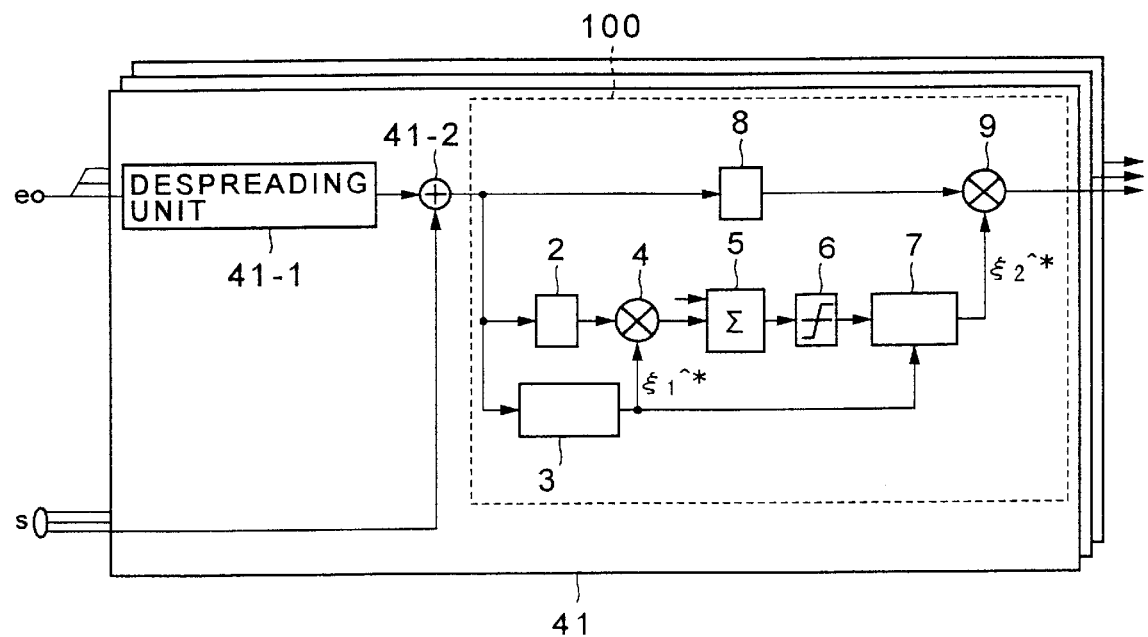
FIG. 19 is a block diagram of a despreading unit provided in a final stage of the interference removing apparatus shown in FIG. 16.

FIG. 19 is a block diagram of the despreading unit 41 in which the coherent detecting circuit 100 according to the first embodiment of the present invention is incorporated. In FIG. 19, a part encircled by dotted lines is the same as the coherent detecting circuit 100 according to the first embodiment of the present invention. Thus, the same reference numerals are given, and a description thereof will be omitted.

It should be noted that the coherent detecting circuits according to one of the second to fourth embodiments of the present invention can be used instead of the coherent detecting circuit 100 shown in FIGS. 18 and 19.

The present invention is not limited to the specifically disclosed embodiments, and variations and modifications may be made without departing from the scope of the present invention.

The present application is based on Japanese priority applications No.9-292063 filed on Oct. 24, 1997 and No.10-157085 filed on Jun. 5, 1998, the entire contents of which are hereby incorporated by reference.

What is claimed is:

1. A method for detecting synchronism in reception of data symbols transmitted in a mobile communication system by using at least one pilot symbol received from a transmitter, the method comprising the steps of:

a) estimating a propagation characteristic of a propagation path established in said mobile communication system by using the pilot symbol;

b) tentatively determining the data symbols based on an estimated value of the propagation path obtained in step a);

c) estimating the propagation characteristic of the propagation path by using the pilot symbol and at least one of the data symbols tentatively determined in step b); and d) finally determining the data symbols based on an estimated value of the propagation characteristic of the propagation path obtained in step c).

2. The method as claimed in claim 1, wherein the step d) includes the step of:

repeating a tentative determination of the data symbols based on an estimated value of the propagation characteristic which is obtained according to the pilot symbol and at least one of the data symbols tentatively determined by the immediately preceding tentatively determining step so as to estimate the propagation characteristic a plurality of times.

3. The method as claimed in claim 1, wherein the pilot symbol is provided in a data frame of the data symbols.

4. The method as claimed in claim 3, wherein at least two pilot symbols are provided in a data string of the data symbols, and said one of the tentatively determined data symbols used in step c) is selected from among the data symbols located substantially midway between the two pilot symbols.

5. The method as claimed in claim 3, wherein at least two pilot symbols are provided In a data string of the data symbols, and the propagation characteristic at a position between the two pilot symbols is obtained by interpolation based on estimated values of the propagation characteristic obtained from each of the two pilot symbols and a plurality of data symbols between the two pilot symbols.

6. The method as claimed in claim 1, wherein the pilot symbol is provided in a channel different from a data channel through which the data symbols are transmitted.

7. A mobile communication receiver detecting synchronism in reception of data symbols by using at least one pilot symbol received from a transmitter, the mobile communication receiver comprising:

a first propagation characteristic estimation circuit estimating a first estimated value of a propagation characteristic of a propagation path by using the pilot symbol;

a tentatively determining circuit tentatively determining the data symbols based on said first estimated value of the propagation characteristic obtained by said first propagation characteristic estimation circuit;

a second propagation characteristic estimation circuit estimating a second estimated value of the propagation characteristic by using the pilot symbol and at least one of the data symbols tentatively determined by said tentatively determining circuit; and a final determining circuit determining the data symbols based on said second estimated value of the propagation characteristic obtained by said second propagation characteristic estimation circuit.

8. The mobile communication receiver as claimed in claim 7, further comprising a plurality of additional tentatively determining circuits connected in series, each of said additional tentatively determining circuits tentatively determining the data symbols based on an estimated value of the propagation characteristic which is obtained by the pilot symbol and at least one of the data symbols tentatively determined by an immediately preceding one of said additional tentatively determining circuits.

9. An interference removing apparatus for a mobile communication system in which a string of data symbols and at least one pilot symbol are transmitted, the interference removing apparatus comprising:

a first propagation characteristic estimation circuit estimating a first estimated value of a propagation characteristic of a propagation path by using the pilot symbol;

a tentatively determining circuit tentatively determining the data symbols based on said first estimated value of the propagation characteristic obtained by said first propagation characteristic estimation circuit;

a second propagation characteristic estimation circuit estimating a second estimated value of the propagation characteristic by using the pilot symbol and at least one of the data symbols tentatively determined by said tentatively determining circuit; and a final determining circuit determining the data symbols based on said second estimated value of the propagation characteristic obtained by said second propagation characteristic estimation circuit.

10. The interference removing apparatus as claimed in claim 9, further comprising a plurality of additional tentatively determining circuits connected in series, each of said additional tentatively determining circuits tentatively determining the data symbols based on an estimated value of the propagation characteristic which is obtained by the pilot symbol and at least one of the data symbols tentatively determined by an immediately preceding one of said additional tentatively determining circuits.

* * * * *